US012617292B2

(12) United States Patent
Oh et al.

(10) Patent No.: US 12,617,292 B2
(45) **Date of Patent: *May 5, 2026**

(54) METHOD OF CONTROLLING DRIVE SYSTEM TORQUE OF ELECTRIC VEHICLE

(71) Applicants: HYUNDAI MOTOR COMPANY, Seoul (KR); KIA CORPORATION, Seoul (KR)

(72) Inventors: Ji Won Oh, Hwaseong-si (KR); Ho Wook Lee, Seoul (KR); Jeong Soo Eo, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 156 days.

This patent is subject to a terminal disclaimer.

(21) Appl. No.: 18/383,164

(22) Filed: Oct. 24, 2023

(65) Prior Publication Data

US 2024/0391326 A1 Nov. 28, 2024

(30) Foreign Application Priority Data

May 23, 2023 (KR) ........................ 10-2023-0066035

(51) Int. Cl.
*B60L 15/20* (2006.01)
*B60L 3/06* (2006.01)

(52) U.S. Cl.
CPC ............. *B60L 15/2036* (2013.01); *B60L 3/06* (2013.01); *B60L 2240/16* (2013.01); (Continued)

(58) Field of Classification Search
CPC .... B60L 15/2036; B60L 3/06; B60L 2240/16; B60L 2240/18; B60L 2240/24; B60L 2240/423; B60L 2250/26; B60L 15/20; B60L 2220/42; Y02T 10/72; Y02T 10/64; B60W 30/20; B60W 10/08; B60W 2510/083; B60W 2520/105; (Continued)

(56) References Cited

U.S. PATENT DOCUMENTS

2016/0185336 A1* 6/2016 Ueno ................... B60W 10/115
180/65.265
2019/0293172 A1* 9/2019 Shinohara .............. B60K 17/02
(Continued)

FOREIGN PATENT DOCUMENTS

KR 10-2014-0049638 A 4/2014
KR 10-1704243 B1 2/2017
KR 10-2022-0096746 A 7/2022

*Primary Examiner* — Kyle J Kingsland
(74) *Attorney, Agent, or Firm* — Morgan Lewis & Bockius LLP

(57) ABSTRACT

A method of controlling a drive system torque of an electric vehicle for generating a torque by evading a backlash band to prevent the occurrence of backlash in the drive system includes determining, by a controller, whether a plurality of predetermined entry conditions for entering a responsiveness priority mode of the vehicle are satisfied in a predetermined order based on vehicle driving information in a state in which control of a power priority mode is performed, and transitioning, by the controller, a mode to the responsiveness priority mode when it is determined that the plurality of entry conditions are sequentially satisfied and performing control of the responsiveness priority mode.

18 Claims, 9 Drawing Sheets

(52) U.S. Cl.
CPC ....... *B60L 2240/18* (2013.01); *B60L 2240/24*
(2013.01); *B60L 2240/423* (2013.01); *B60L*
*2250/26* (2013.01)

(58) Field of Classification Search
CPC ....... B60W 2520/125; B60W 2540/10; B60W
2540/12; B60W 2540/18; B60Y 2200/91;
B60Y 2300/20; B60Y 2306/09
See application file for complete search history.

(56) References Cited

U.S. PATENT DOCUMENTS

| | | | |
|---|---|---|---|
| 2020/0231048 A1* | 7/2020 | Gauthier | B60L 15/34 |
| 2020/0391598 A1* | 12/2020 | Lee | H02P 6/08 |
| 2025/0065881 A1* | 2/2025 | Shen | B60W 30/20 |

* cited by examiner

Backlash band evasion zone(C)

Maximum acceleration

Transition from neutral balance to slow acceleration(A2)

Neutral balance and/or trail braking

Braking(A1)

Acceleration

[ POWER PRIORITY MODE ]

[ RESPONSIVENESS PRIORITY MODE (ON) ]

APS VALUE(%)

ACCELERATOR
POSITION INPUT VALUE

REAR WHEEL
TORQUE COMMAND

TORQUE

FRONT WHEEL
MAXIMUM TORQUE
THRESHOLD

REAR WHEEL MINIMUM
TORQUE THRESHOLD

FRONT WHEEL
TORQUE COMMAND

SPEED

VEHICLE SPEED

LONGITUDINAL
ACCELERATION

ACCELERATION

POWER
PRIORITY
MODE

TIME

METHOD OF CONTROLLING DRIVE SYSTEM TORQUE OF ELECTRIC VEHICLE

CROSS-REFERENCE TO RELATED APPLICATION

The present application claims priority to Korean Patent Application No. 10-2023-0066035 filed on May 23, 2023, the entire contents of which is incorporated herein for all purposes by this reference.

BACKGROUND OF THE PRESENT DISCLOSURE

Field of the Present Disclosure

The present disclosure relates to a method of controlling a drive system torque of an electric vehicle, and more specifically, to a torque control method configured for generating a torque by evading a backlash band of a drive system in an electric vehicle.

Description of Related art

In general, a drive system of a vehicle should generate an appropriate torque according to a torque command determined based on a driving input value (e.g., an accelerator position input value or a brake pedal position input value) of a driver or a request of an advanced driver assistance system (ADAS).

In the instant case, when a torque change rate is set too high, problems such as the torsion of a driveshaft, the strike of gear backlash, or the degradation of drivability caused by an impact due to rapidly changing torque occur.

Conversely, when the torque change rate is limited too small, it takes an excessive time to provide a torque required by a driver or an ADAS controller, and an actual behavior of a vehicle may differ from the driver's intention, causing frustrating responsiveness or dangerous situations.

As described above, a degree of a reduction in noise, vibration, and harshness (NVH) in the vehicle and a degree of securing the acceleration/deceleration responsiveness of the vehicle due to a rapid change in a torque have a trade-off relationship.

In current mass-produced vehicles, slope limiting and filters using various conditions as factors are used to generate an optimal torque command capable of resolving the trade-off relationship.

Furthermore, in electrified vehicles using a motor as a driving source or a part of the driving source, active feedback torque correction control capable of suppressing vibration, which has already occurred, using the motor is also applied in some cases.

However, even when advanced backlash post-correction control is applied, it is difficult to suppress a problem of degrading vehicle responsiveness, which inevitably occurs chronically due to the characteristics of hardware. Moreover, the noise, vibration, and harshness (NVH) issues due to backlash frequently occur in electric vehicles with few vibration damping elements in the drive system.

A related art discloses a method of generating a model speed of a driveshaft using a disturbance observer and reducing vibration using a deviation between the model speed and an actual speed of the driveshaft. In addition, a method of calculating the model speed based on a wheel speed instead of the disturbance observer in the method of determining the model speed is also disclosed.

Furthermore, a related art discloses a method of generating a model speed of a motor using an input torque model and reducing vibration using a deviation between the model speed and an actual speed of the motor.

Furthermore, a related art discloses a method of estimating a speed of a drive system using a torque model and determining a slope of a torque command using a speed difference between an actual speed and an estimated speed of a drive system.

However, all of the related art only suggest a torque correction method for reducing and suppressing vibration generated in a drive system and do not suggest a torque determination method capable of preventing the occurrence of vibration itself Therefore, in relation to the backlash of the drive system, a control method capable of generating a torque command by evading a backlash band in which the backlash of the drive system may occur rather than a control method of solving the problem caused by the backlash is required.

The information disclosed in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a drive system torque command generation and torque control method, which may be configured to generate a torque by evading a backlash band to prevent the occurrence of backlash in a drive system.

An object of the present disclosure is not limited to the above-described object, and other objects that are not mentioned will be able to be clearly understood by those skilled in the art to which the present disclosure pertains (hereinafter referred to as "those skilled in the art") from the following description.

An exemplary embodiment of the present disclosure provides a method of controlling a drive system torque of an electric vehicle including determining, by a controller, an entire torque command required for travel of a vehicle, determining, by the controller, whether a plurality of predetermined entry conditions for entering a responsiveness priority mode of the vehicle are satisfied in a predetermined order based on vehicle driving information in a state in which control of a power priority mode in which front wheel torque control and rear wheel torque control are performed using a front wheel torque command and a rear wheel torque command respectively is performed, and transitioning, by the controller, a mode to the responsiveness priority mode in which the front wheel torque control and the rear wheel torque control are performed using the front wheel torque command and the rear wheel torque command for evading a backlash band, which is a torque region in which backlash of a drive system occurs, in response that the plurality of entry conditions are sequentially satisfied and performing control of the responsiveness priority mode.

Therefore, according to the method of controlling the torque of the drive system of the electric vehicle according to an exemplary embodiment of the present disclosure, it is possible to prevent the occurrence of backlash itself while the motor is used only in a torque region irrelevant to backlash while the backlash band evasion control is executed.

Furthermore, it is possible to effectively solve problems such as backlash vibration, noises, and impact, perform the motor control specialized for the high-performance driving mode, improve vehicle turning performance, and greatly improve the longitudinal responsiveness of the vehicle as the occurrence of the torque is possible without worrying about the backlash problem.

Furthermore, it is possible to provide the driving mode emphasizing the sense of direct connection for the high-performance electric vehicle only, improve the convenience and accuracy of the load movement control during track turning, and improve the ease of use of the special driving mode such as a drift mode.

Furthermore, in an exemplary embodiment of the present disclosure, it is possible to perform the active even throttle assist function that assists performance-oriented driving by performing the active switching between the power priority mode and the responsiveness priority mode, improve the turning performance of the vehicle, shorten the lap time of the vehicle, and improve the transverse stability during turning.

It is understood that the term "automotive" or "vehicular" or other similar term as used herein is inclusive of motor automotives in general such as passenger vehicles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
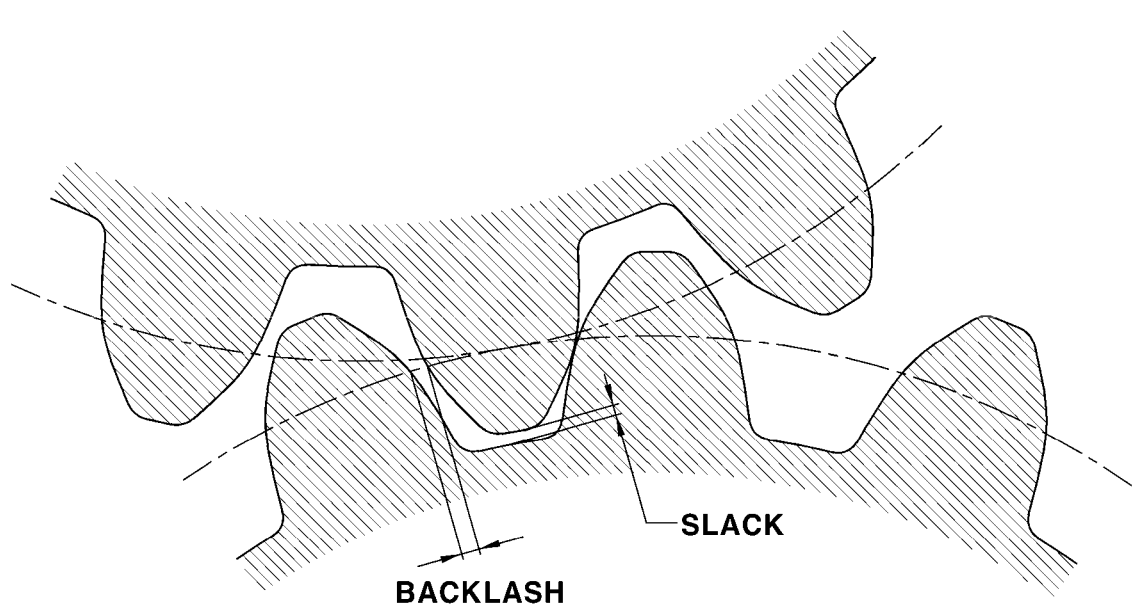
FIG. 1 is a view exemplarily illustrating backlash.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. Specific structural or functional descriptions presented in the exemplary embodiments of the present disclosure are merely exemplified for describing the embodiments according to the concept of the present disclosure, and the embodiments according to the concept of the present disclosure may be implemented in various forms. Furthermore, the present disclosure should not be construed as being limited by the embodiments described in the specification, and it should be understood that the present disclosure includes all modifications, equivalents, or substitutes included in the spirit and technical scope of the present disclosure.

Meanwhile, in an exemplary embodiment of the present disclosure, terms such as first and/or second may be used to describe various components, but the components are not limited by the terms. The above terms are used only for distinguishing one component from another, for example, without departing from the scope of the present disclosure according to the concept of the present disclosure, and a first component may be referred to as a second component, and similarly, the second component may also be referred to as the first component.

When a certain component is referred to as being "connected" or "coupled" to another component, it should be understood that the certain component may be directly connected or coupled to another component or other components may also be disposed therebetween. On the other hand, when a certain component is referred to as being "directly connected" or "directly coupled" to another component, it should be understood that other components are not disposed therebetween. Other expressions for describing the relationship between components, such as "between" and "directly between" or "adjacent to" and "directly adjacent to" should be construed in the same manner.

The same reference numbers denote the same components throughout the specification. Terms used in the specification are for describing the exemplary embodiments and are not intended to limit the present disclosure. In the specification, the singular form also includes the plural form unless stated in the phrase. As used herein, "comprises" and/or "comprising" means that the stated component, step, operation, and/or element do not preclude the presence of addition of one or more other components, steps, operations, and/or elements.

The present disclosure relates to a method of controlling a drive system torque of an electric vehicle and relates to a torque command generation and torque control method, which may generate a torque command by evading a backlash band in which backlash may occur, to prevent the occurrence of the backlash in the drive system rather than a control method of solving a problem due to the backlash of the drive system.

In an exemplary embodiment of the present disclosure, a method of separating operating torque regions of a front wheel motor and a rear wheel motor is used to generate a torque command by evading a backlash band in a drive system. However, the present method includes a disadvantage in that it is difficult to generate a maximum driving force.

Therefore, by appropriately determining and classifying a case in which a responsiveness priority mode (backlash band evasion mode) for evading the backlash band and securing responsiveness needs to be used and a case in which a power priority mode (normal mode), which is a conventional torque control mode in which a maximum power may be generated, needs to be used, a mode needs to be selected and applied. Considering the present point, the present disclosure suggests a determination method for allowing a vehicle to actively switch between the two modes of the responsiveness priority mode and the power priority mode.

In an exemplary embodiment of the present disclosure, the backlash band may be defined as a torque region in which backlash may occur in a drive system of a vehicle. Here, the drive system of the vehicle includes driving elements such as a driveshaft between a driving device and a driving wheel, a reducer, a differential, and an axle in addition to the driving device and driving wheel for driving the vehicle.

In an exemplary embodiment of the present disclosure, the drive system includes a front wheel side drive system between a front wheel driving device (front wheel motor) and a front wheel, and a rear wheel side drive system between a rear wheel driving device (rear wheel motor) and a rear wheel.

Furthermore, in an exemplary embodiment of the present disclosure, a torque is used as a meaning including both a torque input to the drive system by the driving device and transmitted and applied to the driving wheel and a torque input from the driving wheel to the drive system and transmitted and applied to the driving device.

Furthermore, in an exemplary embodiment of the present disclosure, the torque is used to include both a driving torque for accelerating the vehicle and a braking torque for decelerating the vehicle, and among them, the braking torque (deceleration torque) means a regenerative torque generated by a motor.

Unless specified separately as the driving torque and the braking torque in the specification, depending on a traveling situation of a vehicle, the torque may be the driving torque for accelerating the vehicle (acceleration situation) or the braking torque for decelerating the vehicle (deceleration situation).

In an exemplary embodiment of the present disclosure, a driving torque and a driving torque command include a torque value for accelerating the vehicle, which is defined as a forward and positive (+) torque value. On the other hand, a braking torque and a braking torque command include a torque value for decelerating the vehicle, which is defined as a backward and negative (−) torque value.

In the following description, when the front wheel torque command and the rear wheel torque command have negative (−) values, both the front wheel torque command and the rear wheel torque command including the negative (−) values refer to regenerative torque commands.

As described above, when the vehicle travels, the positive (+) torque, which is a forward torque, or the negative (−) torque, which is a backward torque, is applied to the drive system depending on whether the vehicle is accelerating or decelerating, and a direction of the torque input to the drive system and transmitted through the drive system may be changed depending on the traveling situation of the vehicle.

The present disclosure has been made based on a principle that problems due to backlash in the drive system of the vehicle mainly occur only in a torque region close to zero, and the torque region close to zero may be referred to as a backlash band in which the backlash problem may occur.

In an exemplary embodiment of the present disclosure, the backlash band may be set to a torque range from a lower limit threshold, which is a negative (−) value, and an upper limit threshold, which is a positive (+) value. That is, the backlash band may be set to a torque range including zero, and a backlash state may occur when an input torque applied from a motor, which is a driving device, to the drive system or from the driving wheel to the drive system enters the set backlash band.

The backlash is a tolerance which is present between teeth of two engaged gears as illustrated in FIG. 1. Between the two engaged gears, vibration or noise may be generated as gear teeth strike each other due to the backlash, and in the worst situation, the backlash may cause damage to the gear.

When a torque is continuously applied in one direction, one of the two engaged gears continuously transmits a force to the other one in the same direction, and thus the teeth of the two engaged gears maintain a state of being aligned and engaged forward, and at the instant time, no problem due to the tolerance occurs.

However, when the direction of the torque is changed, the teeth of the gears are reversely aligned after undergoing the backlash tolerance as the direction of the transmitted force is changed. At the instant time, after the alignment in the reverse direction is performed, the problem due to the backlash does not occur because the engagement of the gears is not released again while the force in the same direction is continuously re-transmitted.

However, at the moment when the direction of the transmitted force is changed, the problem due to the backlash occurs when the engagement between the teeth of the two gears is released and then the engagement is re-performed while the teeth of the two gears undergo the engagement tolerance.

Therefore, the core of a method for not causing the backlash problem is to eliminate or minimize a situation in which gears are disengaged, which may be achieved by eliminating or minimizing a change in a direction of a torque command with respect to a driving device such as a motor.

To minimize the change in the direction of the torque command, the front and rear wheel driving devices, that is, the front wheel motor and the rear wheel motor may share the role, and to the present end, the separation of the torque operating regions of the front wheel motor and the rear wheel motor may be considered.

Figure 2:
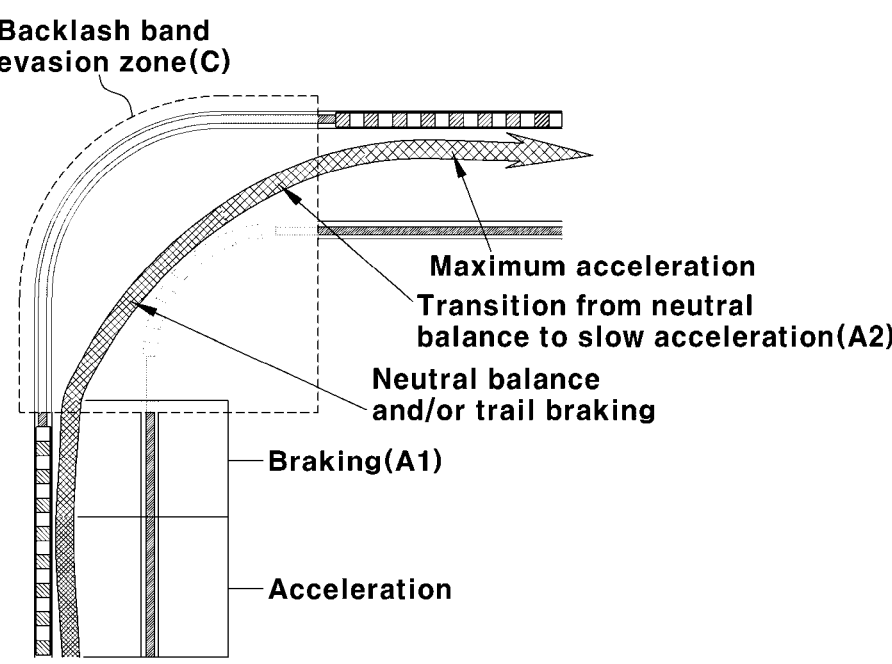
FIG. 2 is a view exemplarily illustrating a zone in which backlash band evasion control may be executed during track driving in an exemplary embodiment of the present disclosure.

FIG. 2 is a view exemplarily illustrating an acceleration/deceleration guide for an ideal track turning behavior and illustrates a zone C in which backlash band evasion control may be executed during track traveling.

A technology of inducing fun-driving on a track based on track information including track position information and track route information (including turning zone information) obtained in advance and real-time vehicle position information is already being mass-produced and applied.

In an exemplary embodiment of the present disclosure, a controller may be configured to determine whether a vehicle enters a track based on the track position information and then automatically determine whether the backlash band evasion control configured for minimizing a lap time is executed based on the track route information including the turning zone information and the real-time vehicle position information in the track during a track mode in which the vehicle travels along the track. The entry and release of the backlash band evasion mode may be autonomously selected by the present determination according to a position of the vehicle on the track route.

Referring to FIG. 2, the turning zone C in the track may be referred to as a zone in which the backlash band evasion control may be executed ("backlash band evasion zone"). The turning zone C in the track may be defined as a range from at least a portion of the end portion of a braking zone marked "A1" and "Braking" to a portion of a gradual acceleration zone marked "A2," and a maximum acceleration torque is not used in the turning zone C.

That is, the maximum acceleration torque is not required in an even-throttle or neutral balance zone in which precise longitudinal load movement control and responsiveness of the vehicle is required, such as the turning zone C in the track.

Therefore, it is very effective to execute the backlash band evasion control only while the vehicle passes through the turning zone C, and therefore, in an exemplary embodiment of the present disclosure, the controller may be set to automatically select the backlash band evasion mode only while the vehicle passes through the turning zone C based on the track information and the real-time vehicle position information in the track.

That is, when a driving mode of the vehicle is a track mode in which the vehicle is passing the turning zone C, the controller may be configured to determine that the backlash band evasion mode has been automatically selected and then perform a control process of the responsiveness priority mode, which is the backlash band evasion mode. of course, when the controller determines that the power priority mode (normal mode), which is the conventional torque control mode, has been selected, thereafter, the control process of the power priority mode may be performed.

The present disclosure to be described below is based on the fact that a maximum power required during turning of the vehicle as in the track of FIG. 2 during performance-oriented driving does not reach a maximum power at which the driving device of the vehicle may be provided.

In general, such a control strategy of generating a maximum torque is not effective because, when the maximum torque is generated unreasonably in a severe turning zone, it may lead to a serious deterioration in stability in the behavior of the vehicle.

Therefore, it is possible to allow the vehicle to determine the performance-oriented driving situation and the turning situation and actively select the power priority mode (normal mode), which is the conventional torque control mode configured for generating the maximum power or select the responsiveness priority mode in which responsiveness is prioritized by evading the backlash band even when the maximum power is limited as the torque control mode of the vehicle.

In the following description, the conventional torque control mode in which the maximum power may be generated is referred to as "power priority mode" or "normal mode," and the torque control mode in which the backlash band evasion control is performed to evade the backlash band is referred to as "backlash band evasion mode," "responsiveness priority mode," or "even throttle assist mode."

Furthermore, by performing active switching between the power priority mode and the responsiveness priority mode, a function of ultimately assisting performance-oriented driving is referred to as "active even throttle assist function" or "active throttle balancing assist function."

In an exemplary embodiment of the present disclosure, the even throttle assist (throttle balancing assist) is performed in a state of entering the responsiveness priority mode. In the following description, the "even throttle" and the "throttle balancing" may be understood as the same meaning.

Figure 3:
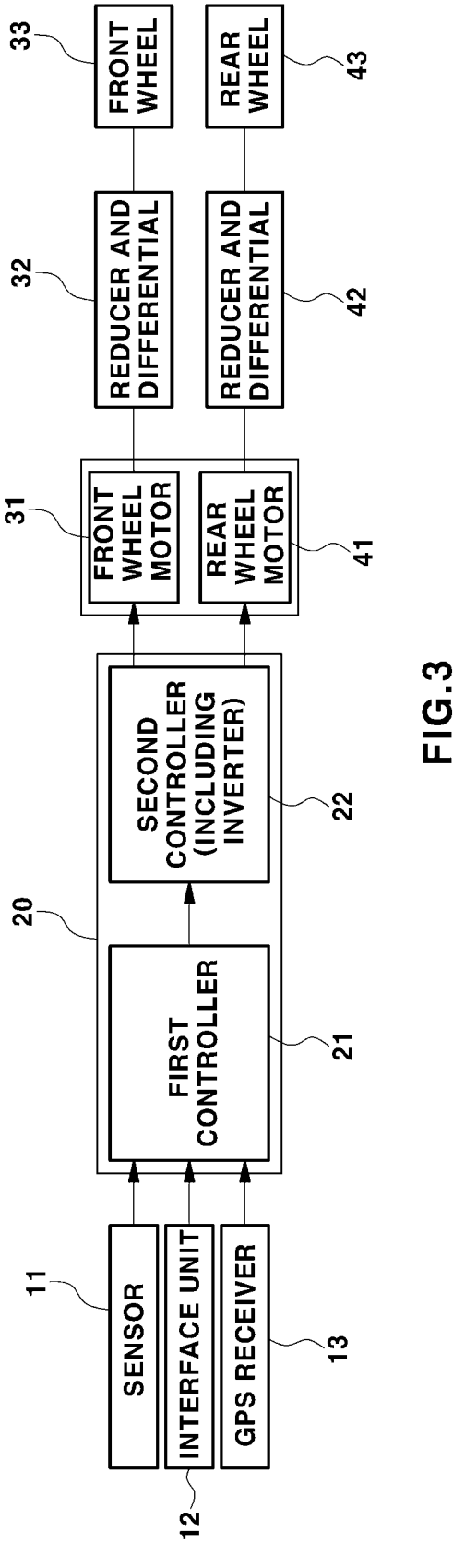
FIG. 3 is a block diagram illustrating a configuration of a device configured for performing a drive system torque control process according to an exemplary embodiment of the present disclosure.
Figure 4:
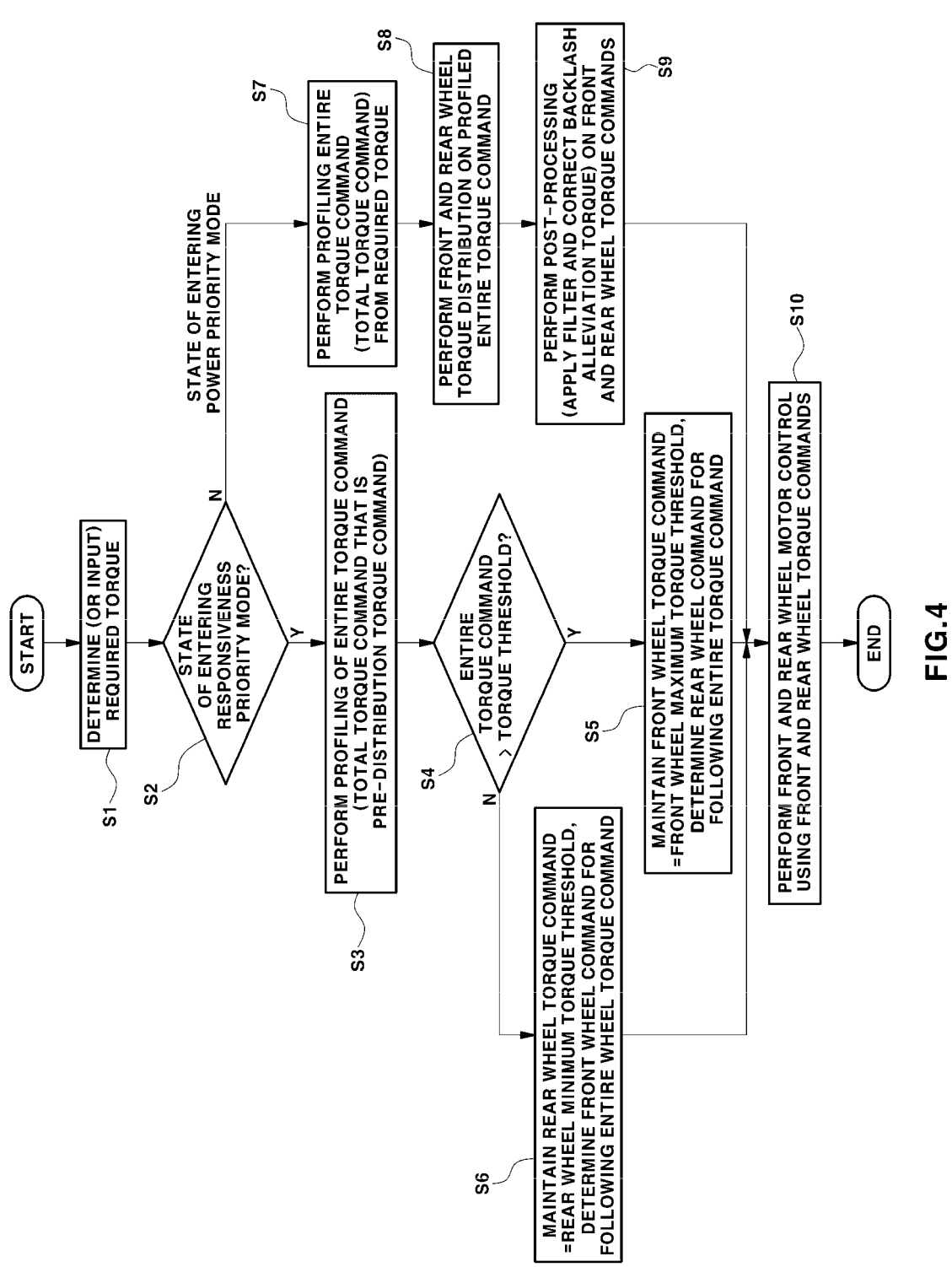
FIG. 4 is a flowchart illustrating the drive system torque control process according to the exemplary embodiment of the present disclosure.

FIG. 3 is a block diagram illustrating a configuration of a device configured for performing a drive system torque control process according to an exemplary embodiment of the present disclosure, and FIG. 4 is a flowchart illustrating the drive system torque control process according to the exemplary embodiment of the present disclosure.

The present disclosure may be applied to a vehicle provided with a plurality of driving devices as a driving source for driving the vehicle and applied to a vehicle in which each of a front wheel 33 and a rear wheel 43 is driven by an independent driving device. Furthermore, the present disclosure may be applied to an electric vehicle that travels using motors 31 and 41 as the driving device.

The present disclosure may be applied to a vehicle provided with a front wheel driving device configured for applying a torque to the front wheel 33 and a rear wheel driving device configured for applying a torque to the rear wheel 43. Here, both the front wheel 33 and the rear wheel 43 are driving wheels connected to the driving devices to transmit a power.

Furthermore, the present disclosure may be applied to a vehicle in which both the front wheel driving device and the rear wheel driving device are motors. In the following description, the motor 31 for driving the front wheel 33 will be referred to as "front wheel motor," and the motor 41 for driving the rear wheel 43 will be referred to as "rear wheel motor."

Referring to FIG. 2, the front wheel motor 31 and the rear wheel motor 41 are illustrated as driving devices of an electric vehicle. The front wheel motor 31 and the rear wheel motor 41 are respectively connected to the front wheel 33 and the rear wheel 43, which are driving wheels, through drive system elements such as reducers, differentials 32 and 42, and axles to transmit a power.

Therefore, torques output from the front wheel motor 31 and the rear wheel motor 41 may be transmitted to the front wheel 33 and the rear wheel 43 through the drive system elements such as the reducers, the differentials 32 and 42, and the axles.

Furthermore, although not separately illustrated in FIG. 3, a battery is connected to the front wheel motor 31 and the rear wheel motor 41 via inverters to be charged and discharged. The inverter may include a front wheel inverter for driving and controlling the front wheel motor 31 and a rear wheel inverter for driving and controlling the rear wheel motor 41.

In an electric vehicle, operations (driving and regeneration) of the front wheel motor 31 and the rear wheel motor 41 are controlled according to a torque command generated by the controller 20. The controller 20 is configured to determine a required torque according to a vehicle driving state for travel of the vehicle and generates a final torque command (entire torque command) based on the determined required torque.

Furthermore, the controller 20 is configured to control the operations of the front wheel motor 31 and the rear wheel motor 41 through the inverters according to the final torque command. In the following description, when the torque command includes a positive (+) value, the torque command is defined as a driving torque command, and when the torque command includes a negative (–) value, the torque command is defined as a regenerative torque command.

Here, the final torque command is a required torque command required for the travel of the vehicle and is a pre-distribution torque command before front and rear wheel torque distribution is performed. In the following description, the pre-distribution torque command, the summed torque command, the required torque command, and the entire torque command are used as the same meaning.

In an exemplary embodiment of the present disclosure, the controller 20 may include a first controller 21 for determining the required torque based on a driving input value of a driver or receiving the required torque from another controller such as an advanced driver assistance system (ADAS) controller, and generating and outputting the final torque command (required torque command) based on the required torque, and a second controller 22 for controlling the operations of the front wheel motor 31 and the rear wheel motor 41 according to the final torque command input from the first controller 21.

The first controller 21 may be a vehicle control unit (VCU) for determining and generating a torque command for controlling an operation of a motor in a general vehicle. Because a method and process of determining a torque command in a vehicle are well-known technical matters in the art, a detailed description thereof will be omitted.

Furthermore, the first controller 21 may be configured to determine the front wheel torque command and the rear wheel torque command from the final torque command through a front wheel and rear wheel torque distribution process. Therefore, when the final front wheel torque command and rear wheel torque command are output from the first controller 21, the second controller 22 receives the final front wheel torque command and rear wheel torque command and is configured to control the operations of the front wheel motor 31 and the rear wheel motor 41 through the front wheel inverter and the rear wheel inverter.

The second controller 22 may be a conventional motor control unit (MCU) for controlling an operation of a driving motor through an inverter according to a torque command output from a vehicle controller in an electric vehicle.

Although the above description has been made that the control subject is classified into the first controller 21 and the second controller 22, the torque control process according to an exemplary embodiment of the present disclosure may also be performed by one integrated control element instead of a plurality of controllers.

One control element integrated with the plurality of controllers may be collectively referred to as a controller, and a torque control process according to an exemplary embodiment of the present disclosure, which will be described below, may be performed by the controller.

In an exemplary embodiment of the present disclosure, vehicle driving information such as the driving input value of the driver, which is input to the controller 20, is information indicating the vehicle driving state and may include sensor detection information detected by the sensor 11 and input to the controller via a vehicle network.

In the instant case, the sensor 11 for detecting the vehicle driving information may include an accelerator position sensor (APS) for detecting an accelerator position input value (APS value, %) of a driver, a brake pedal position sensor (BPS) for detecting a brake pedal position input value (BPS value, %) of the driver, a steering wheel angle sensor configured for detecting a steering wheel angle (SWA), which is steering input information according to a driver's manipulation of a steering wheel, a longitudinal acceleration sensor configured for detecting a longitudinal acceleration Ax of a vehicle, a transverse acceleration sensor configured for detecting a transverse acceleration Ay of the vehicle, a sensor configured for detecting a speed of a drive system, and a sensor configured for detecting a vehicle speed.

Here, the speed of the drive system may be rotating speeds of the front wheel motor 31 and the rear wheel motor 41, which are the driving motors, or rotating speeds (wheel speeds) of the driving wheels 33 and 43. In the instant case, the sensor configured for detecting the speed of the drive system may be a sensor configured for detecting the rotation speed of each of the motors 31 and 41, which may be a general resolver for detecting a position of a rotor of the motor. Alternatively, the sensor configured for detecting the speed of the drive system may be a general wheel speed sensor configured for detecting the rotating speeds (wheel speeds) of the driving wheels 33 and 43.

Furthermore, the sensor configured for detecting the vehicle speed may also be the wheel speed sensor. Because obtaining the vehicle speed information from the signal from the wheel speed sensor is a well-known technique in the art, a detailed description thereof will be omitted.

As the vehicle driving information detected by the sensor 11 and for determining and generating the required torque and the torque command from the controller 20, the APS value (%) of the driver, the BPS value (%) of the driver, the SWA, the longitudinal acceleration Ax of the vehicle, the transverse acceleration Ay of the vehicle, the rotating speeds of the motors 31 and 41, the rotating speeds of the driving wheels 33 and 43, the vehicle speed, etc. may be selectively used.

Among the vehicle driving information, the APS value, the BPS value, and the SWA, which are the pedal input values of the driver, may be considered as the driving input information of the driver, and the vehicle longitudinal acceleration Ax, the vehicle transverse acceleration Ay, the rotating speeds of the motors 31 and 41, the wheel speeds of the driving wheels 33 and 43, and the vehicle speed may be considered as the vehicle state information.

Furthermore, the vehicle driving information may also include information determined by the controller 20 itself in a broad sense and furthermore, may also include information (e.g., the required torque information) input to the controller

20 from another controller (e.g., an ADAS controller) in the vehicle via the vehicle network.

In FIG. 2, reference numeral "12" denotes an interface unit connected to the controller 20 in the vehicle, and the interface unit 12 may include an input device and an output device. In an exemplary embodiment of the present disclosure, the interface unit 12 may be provided to enable a driver's manipulation, input, and selection, display of various information, etc and used to perform an ON/OFF operation of the responsiveness priority mode (backlash band evasion mode), provide various user interfaces (UI), etc.

In an exemplary embodiment of the present disclosure, the input device and the output device of the interface unit 12 may be used by being selected from known devices as long as they may perform the ON/OFF operation of the responsiveness priority mode, the driver's input and selection, the display of various information, etc.

For example, the interface unit 12 may include an operating device such as a button or switch provided in a vehicle, an input device or display device of an audio, video, navigation (ANV) system, a touch screen, etc.

In FIG. 2, reference numeral "13" denotes a Global Positioning System (GPS) receiver mounted on the vehicle and connected to the controller 20, and the Global Positioning System (GPS) receiver 13 is provided to receive a GPS signal indicating a current position of the vehicle from of the outside of the vehicle.

The GPS receiver 13 is provided to input the received GPS signal to the controller 20. Therefore, the controller 20 may be configured to determine and decide the current position of the vehicle in real time from the GPS signal received through the GPS receiver 13.

Meanwhile, the present disclosure provides a method of generating a torque command by evading the backlash band in which the backlash of the drive system may occur, and here, the evasion of the backlash band is to maximally prevent a situation in which the torque command enters the backlash band.

This may be achieved through a method of maintaining the front wheel torque (which means an actual torque) and the front wheel torque command as only the negative (−) torque values and the rear wheel torque (which means an actual torque) and the rear wheel torque command as only the positive (+) torque values. As described above, the backlash issue is because there are the characteristics that occur when the direction of the torque is changed.

When the control method is applied, the gears are continuously aligned in the positive (+) torque transmission direction in order not to enter the backlash band in the rear wheel side drive system, which may be achieved by continuously generating at least a small amount of positive (+) directional torque.

In the instant case, the small amount of positive (+) directional torque for continuously aligning the gears in the positive (+) torque transmission direction may be defined as a rear wheel minimum torque threshold (which is a positive value), and a value (which is the positive value) of the rear wheel torque command during backlash band evasion control may be determined in a region which is greater than or equal to a preset rear wheel minimum torque threshold.

Likewise, the gears are continuously aligned in the negative (−) torque transmission direction in order not to enter the backlash band in the front wheel side drive system, which may be achieved by continuously generating at least a small amount of negative (−) directional torque.

In the instant case, the small amount of negative (−) directional torque for continuously aligning the gears in the negative (−) torque transmission direction may be defined as a front wheel maximum torque threshold (which is a negative value), and a value (which is the negative value) of the front wheel torque command during backlash band evasion control may be determined in a region which is smaller than or equal to a preset front wheel maximum torque threshold.

In an exemplary embodiment of the present disclosure, the rear wheel minimum torque threshold may be set to a torque value which is out of the backlash band, which is a torque region in which the backlash may occur in the rear wheel side drive system, in the controller 20. That is, the rear wheel minimum torque threshold may be set to a value which is greater than an upper limit threshold of the backlash band of the rear wheel side drive system.

Likewise, the front wheel maximum torque threshold may be set to a torque value which is out of the backlash band, which is a torque region in which the backlash may occur in the front wheel side drive system, in the controller 20. In the instant case, the front wheel maximum torque threshold in the controller 20 may be set to a value which is smaller than a lower limit threshold of the backlash band of the front wheel side drive system.

However, a problem which may occur in the present method is that because only the motor of one of a front wheel axle and a rear wheel axle is used for acceleration and regenerative braking (deceleration), a maximum generation power may be insufficient compared to when the motors of both axles are used for all purposes.

That is, because only one of the front wheel motor 31 and the rear wheel motor 41 is used, the maximum generation power may be insufficient compared to when the front wheel motor 31 and the rear wheel motor 41 are used for acceleration or used for regenerative braking. This may make it difficult to achieve maximum acceleration performance or maximum regenerative braking.

However, considering a principle in which during acceleration, the load movement is concentrated on the rear wheel side and thus the torque of the rear wheel axle plays the main role, and conversely, during deceleration, the load movement is concentrated on the front wheel side and thus the regenerative torque of the front wheel axle plays the main role, the backlash band evasion strategy suggested by the present disclosure does not result in a very large performance degradation.

Nevertheless, because it is certain that the use of only the motor of one axle does not reach the maximum performance which may be achieved when the motors of both axles are used together, the following countermeasures may be considered to overcome these limitations.

First, the responsiveness priority mode may be set in the controller 20, and the responsiveness priority mode may be selectively performed. The responsiveness priority mode may be referred to as a backlash band evasion mode in which the backlash band evasion control is performed.

The on or off of the responsiveness priority mode (backlash band evasion mode) may be selected by a driver manipulating the interface unit 12. That is, the driver may turn on or off the responsiveness priority mode using the interface unit 12 connected to the controller 20.

Figure 5A:
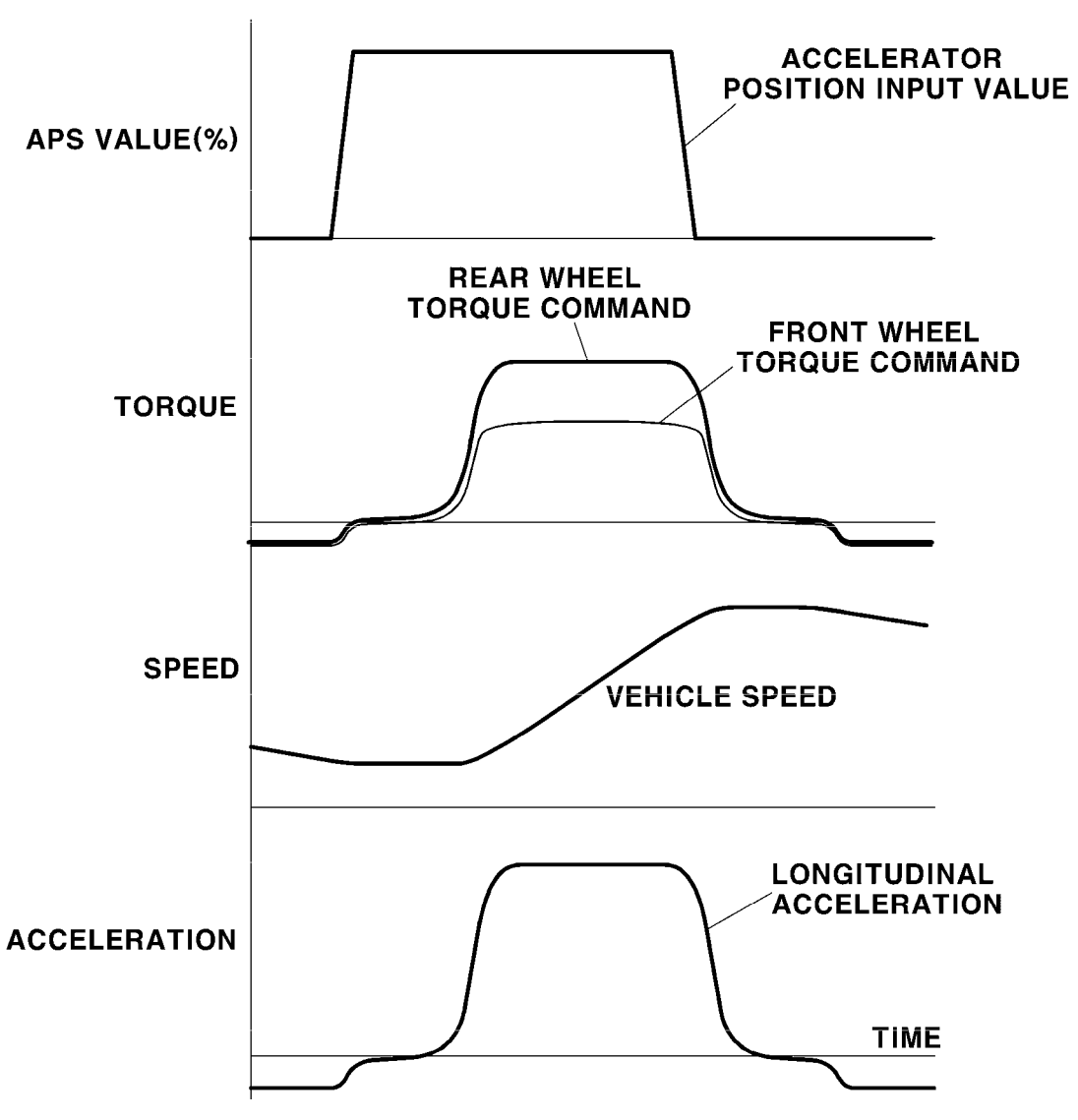
FIG. 5A is a view exemplarily illustrating a control state in a power priority mode in the exemplary embodiment of the present disclosure.
Figure 5B:
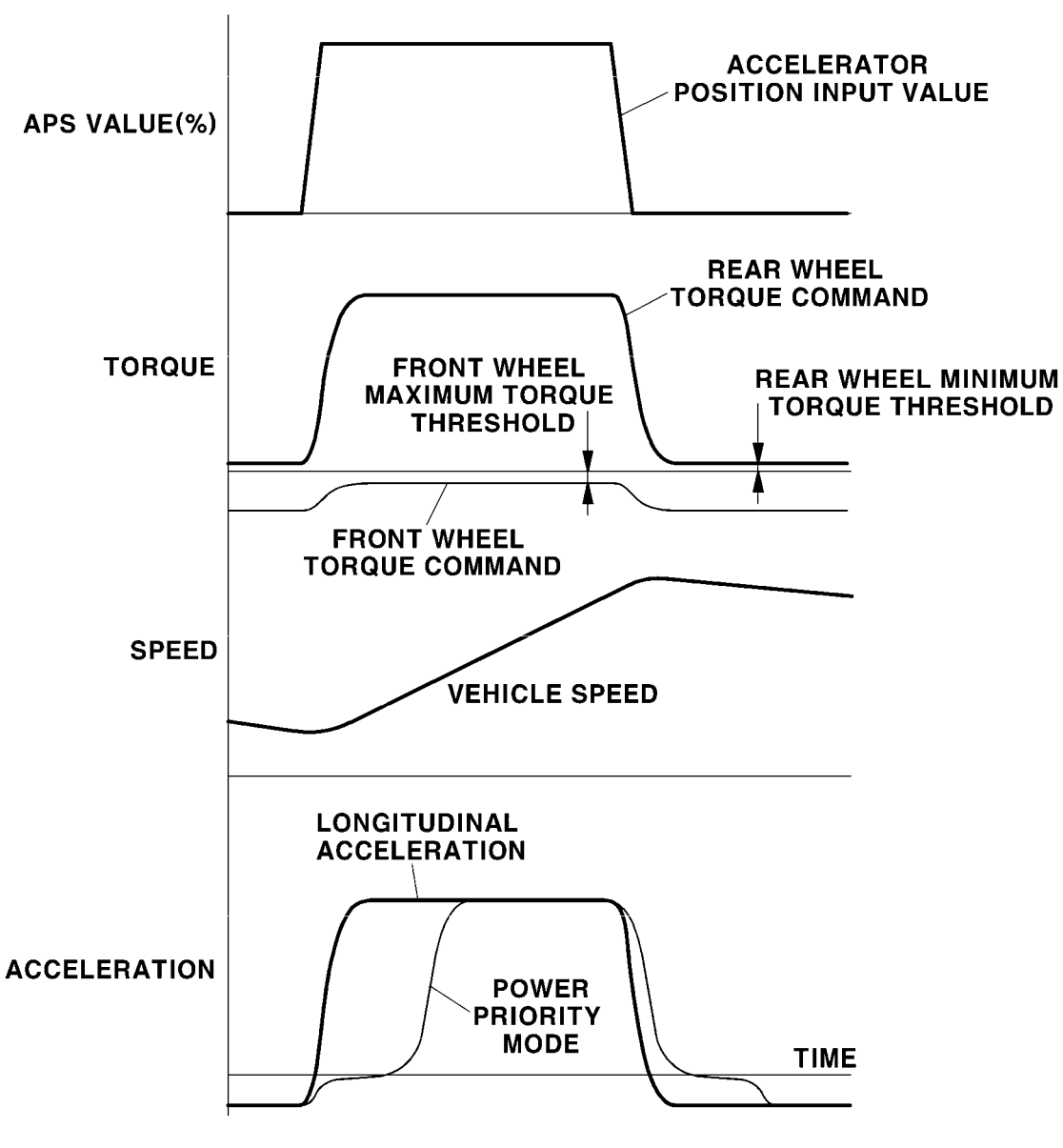
FIG. 5B is a view exemplarily illustrating a control state in a responsiveness priority mode in the exemplary embodiment of the present disclosure.

FIG. 5A is a view exemplarily illustrating a control state in a power priority mode (normal mode) in which a responsiveness priority mode is released in the exemplary embodiment of the present disclosure, and FIG. 5B is a view exemplarily illustrating a control state in a responsiveness priority mode (backlash band evasion mode) in the exemplary embodiment of the present disclosure.

FIG. 5A and FIG. 5B illustrate a method of determining front and rear wheel torque distribution states and front and rear wheel torque commands by the controller 20 during control of the power priority mode (normal mode) and during control of the responsiveness priority mode (backlash band evasion mode) when the APS value is detected through the sensor 11.

In an exemplary embodiment of the present disclosure, even when a predetermined entry condition for the vehicle driving information is satisfied when the driver turns off the responsiveness priority mode through the interface unit 12, the controller 20 may be prevented from entering the responsiveness priority mode, and at the instant time, a state of the power priority mode (normal mode) may be maintained in the state in which the responsiveness priority mode has been released, and the control of the power priority mode may be continuously performed.

On the other hand, when the driver turns on the responsiveness priority mode through the interface unit 12 and the predetermined entry condition is satisfied, the controller 20 may enter the responsiveness priority mode and at the instant time, perform the control of the responsiveness priority mode in the state in which the power priority mode has been released.

In an exemplary embodiment of the present disclosure, the responsiveness priority mode is a mode in which the even throttle (throttle balancing) assist function is performed, and in the state in which the controller 20 has entered the responsiveness priority mode, the backlash band evasion control of limiting the front wheel torque command to the front wheel maximum torque threshold or less or limiting the rear wheel torque command to the rear wheel minimum torque threshold or more is performed by the controller 20.

In the responsiveness priority mode, which is the backlash band evasion mode, the front wheel motor 31 and the rear wheel motor 41 do not generate driving forces in the same direction or regenerative braking forces in the same direction, and because the front wheel motor 31 is configured to perform only regeneration and the rear wheel motor 41 is configured to perform only driving, it is impossible to perform the driving and regeneration of the vehicle with the maximum power.

Instead, in the state of entering the responsiveness priority mode, unlike the power priority mode (normal mode), which is the conventional torque control mode, because the front wheel torque command or the rear wheel torque command does not require a zero-crossing of a torque that passes through a zero torque in the backlash band, it is possible to secure responsiveness.

Furthermore, in an exemplary embodiment of the present disclosure, the power priority mode (normal mode) performed when the responsiveness priority mode is released has no difference compared to the conventional torque control mode. Because the front wheel motor 31 and the rear wheel motor 41 perform driving and regeneration in cooperation with each other upon entry of the power priority mode, it is possible to perform the driving and regeneration of the vehicle with the maximum power.

However, in the state of entering the power priority mode after the response priority mode is released, the zero-crossing of the torque is unavoidable, and thus the responsiveness is inevitably delayed.

Describing the drive system torque control process according to the exemplary embodiment of the present disclosure with reference to FIG. 4, the controller 20 receives the vehicle driving information detected by the sensor 11 and as in the case of the general drive system torque control, is configured to determine the required torque based on the vehicle driving information by itself or receives the required torque from another controller (operation S1 in FIG. 4).

Furthermore, in a state of entering and selecting the power priority mode in operation S2 in FIG. 4, the controller 20 is configured to perform profiling of the entire torque command in the power priority mode (normal mode) based on the required torque (operation S7 in FIG. 4).

In an exemplary embodiment of the present disclosure, the profiling of the entire torque command (the summed torque command, the pre-distribution torque command, and the required torque command) and the determination of the final entire torque command based on the required torque may be understood as the same meaning.

Hereinafter, in the description of the present disclosure, the summed torque command means the entire torque command, which is the pre-distribution torque command, and means the torque command (command including the summed torque value) summing the front wheel torque command and the rear wheel torque command. In an exemplary embodiment of the present disclosure, the torque command for each wheel or the torque command for each axle indicates the front wheel torque command and the rear wheel torque command.

Furthermore, in the description of the present disclosure, the entry into the backlash band means when the torque value of the corresponding torque command becomes a torque value within the backlash band, and the passing of the backlash band means a case in which the torque value of the torque command enters the backlash band from the outside of the backlash band, then continuously increases or decreases, and thus escapes from the backlash band.

The power priority mode (normal mode) is a mode in which the front wheel torque command and the rear wheel torque command are determined and operated in all torque regions of the positive (+) value and the negative (−) value according to the entire torque command (summed torque command), which is the pre-distribution torque command, to satisfy the required torque with the torques applied by the front wheel motor and the rear wheel motor.

For example, in the power priority mode (normal mode), both the front wheel torque command and the rear wheel torque command may be determined as the negative (−) torque values in a situation in which there is no accelerator position input by the driver, that is, in a vehicle deceleration situation in which the driver does not step on an accelerator pedal.

Thereafter, when the driver steps on the accelerator pedal to accelerate the vehicle, both the front wheel torque command and the rear wheel torque command are changed from the negative (−) torque values to the positive (+) torque values in the power priority mode. In the power priority mode, it is inevitable that both the front wheel torque command and the rear wheel torque command pass through the backlash band when the direction of the torque is changed.

At the present time, the sum of the front wheel torque command and the rear wheel torque command needs to follow the entire torque command, and the front wheel torque command and the rear wheel torque command are determined by the general front and rear wheel torque distribution process of distributing the entire torque command according to a front and rear wheel distribution ratio (operation S8 in FIG. 4).

As described above, while the torque passes through the backlash band, even when the driver steps on the accelerator pedal, the direction of the torque applied from the motor to the drive system is not rapidly changed to minimize the backlash problem.

That is, as may be seen in FIG. 5A, the front wheel torque command and the rear wheel torque command are not changed from the negative (−) torques to the positive (+) torques immediately when the driver steps on the accelerator pedal in the power priority mode, and the front wheel torque command and the rear wheel torque command are determined so that the direction of the torque may be changed while the torque applied to the drive system by the motor passes through the backlash band for a predetermined time period after the driver presses the accelerator pedal.

For the time for which the torque passes through the backlash band as described above, torque slope control of limiting a slope (change rate) between the front wheel torque command and the rear wheel torque command is performed not to rapidly increase the torque command. In the power priority mode, the backlash control is performed so that the torque is smoothly changed within the backlash band with respect to both the front wheel torque command and the rear wheel torque command.

To the present end, the controller 20 may set a maximum allowable change rate in the backlash band with respect to the front wheel torque command and the rear wheel torque command to a small value that does not cause a backlash impact.

Therefore, while the front wheel torque command and the rear wheel torque command increase and thus the torque passes through the backlash band, the controller 20 is configured to determine the front wheel torque command and the rear wheel torque command to be a value that smoothly varies depending on the maximum allowable change rate of the small value.

Furthermore, the front wheel torque command and the rear wheel torque command after the torque passes through the backlash band are determined to be magnitudes at which the driving torque required for acceleration may be satisfied through a general front and rear wheel torque distribution process.

As described above, in the power priority mode, in an acceleration situation occurring by the driver pressing the accelerator pedal, both the front wheel torque command and the rear wheel torque command are changed from the negative (−) torque values to the positive (+) torque values, and when the direction of the torque is changed, both the front wheel torque command and the rear wheel torque command pass through the backlash band.

In the power priority mode, because the backlash control of limiting the slope to the maximum allowable change rate with respect to both the front wheel torque command and the rear wheel torque command to minimize the problem caused by the backlash, the acceleration delay of the vehicle in the backlash band is inevitable.

Furthermore, conversely, when the driver tips out the accelerator pedal in a state of pressing the accelerator pedal, both the front wheel torque command and the rear wheel torque command in the power priority mode are changed from the positive (+) torque values to the negative (−) torque values. As described above, even when the direction of the torque is reversely changed, it is inevitable that both the front wheel torque command and the rear wheel torque command pass through the backlash band.

Even when the regenerative torque is required for coasting deceleration traveling after the tip-out of the accelerator pedal, the direction of the torque applied from the motor to the drive system is not rapidly changed to minimize the backlash problem while the torque passes through the backlash band.

That is, as may be seen in FIG. 5A, the front wheel torque command and the rear wheel torque command are not changed from the positive (+) torques to the negative (−) torques immediately when the driver tips out the accelerator pedal in the power priority mode, and the front wheel torque command and the rear wheel torque command are determined so that the direction of the torque may be changed while the torque applied to the drive system by the motor for a predetermined time period after tip-out of the accelerator pedal.

For the time for which the torque passes through the backlash band as described above, the torque slope control of limiting the slope (change rate) between the front wheel torque command and the rear wheel torque command is performed not to rapidly decrease the torque command.

The backlash control is performed so that the torque is smoothly changed within the backlash band with respect to both the front wheel torque command and the rear wheel torque command, and at the instant time, the controller 20 is configured to determine the front wheel torque command and the rear wheel torque command to be a value that smoothly varies depending on the maximum allowable change rate of the small value.

Furthermore, the controller 20 is configured to perform the general front and rear wheel torque distribution to satisfy the regenerative torque required for coasting deceleration traveling after the torque passes through the backlash band, and is configured to determine the front wheel torque command and the rear wheel torque command configured for satisfying the regenerative torque command (pre-distribution torque command) which is the entire torque command during coasting deceleration traveling.

As described above, in the power priority mode, in a coasting deceleration situation occurring by the driver tipping out the accelerator pedal, both the front wheel torque command and the rear wheel torque command are changed from the positive (+) torque values to the negative (−) torque values, and when the direction of the torque is changed, both the front wheel torque command and the rear wheel torque command pass through the backlash band. Therefore, when the accelerator pedal tips-out, the occurrence of a deceleration delay is inevitable.

In the power priority mode, when the front wheel torque command and the rear wheel torque command are determined through the front and rear wheel torque distribution, post-processing may be performed on the determined front and rear wheel torque commands, and at the instant time, it is possible to determine the final front wheel torque command and rear wheel torque command by applying a filter to the commands and performing backlash alleviation torque correction (operation S9 in FIG. 4).

Subsequently, when the final front wheel torque command and the rear wheel torque command are determined, the controller 20 is configured to control the front wheel motor 31 and the rear wheel motor 41 according to the determined final front wheel torque command and rear wheel torque command.

Next, describing the torque control in the state of selecting and entering the responsiveness priority mode (backlash band evasion mode), in a state of currently entering the responsiveness priority mode in operation S2 in FIG. 4, the controller 20 is configured to perform the profiling of the entire torque command, which determines the entire torque command based on the required torque for the backlash band evasion control (operation S3 in FIG. 4).

In the state of entering the responsiveness priority mode, the direction of the torque power by each of the front wheel motor 31 and the rear wheel motor 41 and transmitted through the drive system is controlled to always maintain the same direction in the entire range of the required torque regardless of the acceleration and deceleration situations of the vehicle without fluctuation.

At the present time, the front wheel torque command is always determined to be the negative (−) torque value, and the rear wheel torque command is always determined to be the positive (+) torque value, and therefore, in the state of entering the responsiveness priority mode, while the vehicle travels, the front wheel motor 31 continuously applies the negative (−) torque to the drive system and the rear wheel motor 41 continuously applies the positive (+) torque to the drive system.

As described above, in the responsiveness priority mode, when the front wheel torque command is determined to be the negative (−) torque value and the rear wheel torque command is determined to be the positive (+) torque value, the controller 20 is configured to determine the torque command summing the front wheel torque command and the rear wheel torque command to be a torque value that follows the entire torque command finally determined based on the required torque.

In a deceleration zone in which the vehicle is decelerating because the driver does not press the accelerator pedal, the entire torque command finally determined from the required torque includes the negative (−) torque value as the regenerative torque command.

In the responsiveness priority mode, even in the deceleration zone in which the vehicle is decelerating, the rear wheel torque command is determined to be a value which is greater than or equal to the rear wheel minimum torque threshold set to the positive (+) torque value, and at the instant time, the front wheel torque command is determined to be a value (which is a negative value) obtained by subtracting the determined rear wheel torque (which is a positive torque) from the entire torque command (which is a negative torque).

Referring to FIG. 4, when the entire torque command in operation S3 is compared with the rear wheel minimum torque threshold and the entire torque command is smaller than or equal to the rear wheel minimum torque threshold in operation S4, in operation S6, the controller 20 is configured to determine the rear wheel torque command to be the rear wheel minimum torque threshold and is configured to determine the remaining torque obtained by subtracting the rear wheel minimum torque threshold from the entire torque command to be the front wheel torque command to follow the entire torque command.

The front wheel torque command determined as described above includes the negative (−) torque value. Therefore, the rear wheel motor 41 powers and applies the positive (+) torque to the drive system, and the front wheel motor 31 powers and applies the negative (−) torque to the drive system.

Accordingly, when the driver steps on the accelerator pedal, the front wheel torque command may be determined to be the front wheel maximum torque threshold set to the negative (−) torque value immediately when the driver steps on the accelerator pedal, and at the instant time, the rear wheel torque command is determined to be the positive (+) torque value obtained by subtracting the determined front wheel torque command (which is a negative torque) from the entire torque command (which is a positive torque) corresponding to the accelerator position input value.

Furthermore, when the entire torque command in operation S3 is compared with the front wheel maximum torque threshold and the entire torque command is greater than or equal to the front wheel maximum torque threshold in operation S4, in operation S5, the controller 20 is configured to determine the front wheel torque command to be the front wheel maximum torque threshold and is configured to determine the remaining torque obtained by subtracting the front wheel maximum torque threshold from the entire torque command to be the rear wheel torque command to follow the entire torque command.

As a result, while the driver is stepping on the accelerator pedal, the front wheel motor 31 may power the negative (−) torque corresponding to the front wheel maximum torque threshold, and the rear wheel motor 41 may power the positive (+) torque obtained by subtracting the front wheel motor command (which is a negative torque) from the entire torque command (which is a positive torque).

Accordingly, when there is a tip-out in which the driver takes a foot off the accelerator pedal, the rear wheel torque command may be re-determined to be the rear wheel minimum torque threshold, and the front wheel torque command is determined to be the negative (−) torque value obtained by subtracting the rear wheel torque command (which is a positive torque) from the entire torque command (which is a negative torque) which is the regenerative torque.

As described above, even in the responsiveness priority mode (backlash band evasion mode), the determination of the front wheel torque command and the rear wheel torque command to satisfy the entire torque command is similar to that in the power priority mode (normal mode).

When the front wheel torque command and the rear wheel torque command are determined in operation S5 or operation S6 in FIG. 4, the controller 20 is configured to control the operations of the front wheel motor 31 and the rear wheel motor 41 according to the front wheel torque command and the rear wheel torque command (operation S10).

As described above, in the state of selecting and entering the responsiveness priority mode, the backlash band evasion control in which both the front wheel torque and the rear wheel torque do not pass through the backlash band which is a torque range in which backlash may occur is executed.

As a result, in the responsiveness priority mode, the directions of the front wheel torque and the rear wheel torque are not reversely changed while the vehicle travels, and as a result, a problem due to the backlash does not occur. Furthermore, as illustrated in FIG. 5B, because the vehicle may be accelerated immediately when the driver steps on the accelerator pedal, it is possible to improve the acceleration/deceleration responsiveness of the vehicle.

Meanwhile, the method of controlling the drive system torque according to an exemplary embodiment of the present disclosure includes a method of performing mode selection and transition based on the information indicating the vehicle driving state, that is, the vehicle driving information.

Hereinafter, a process of performing mode selection and transition will be described with reference to FIG. 6 and FIG. 7.

First, the process of transitioning the mode from the power priority mode (normal mode) to the responsiveness priority mode (backlash band evasion mode) includes a process of determining whether the vehicle driving state sequentially satisfies all of a first entry condition, a second entry condition, and a third entry condition in the current state of the power priority mode.

To the present end, the first entry condition, the second entry condition, and the third entry condition for determining whether the vehicle driving state is a state to enter the responsiveness priority mode are preset in the controller 20.

Furthermore, the controller 20 is set to determine that the entry conditions of the responsiveness priority mode are satisfied when the vehicle driving state sequentially satisfies all of the first entry condition, the second entry condition, and the third entry condition from the vehicle driving information.

In an exemplary embodiment of the present disclosure, the entry condition of the responsiveness priority mode may be referred to as a transition condition from the power priority mode to the responsiveness priority mode and may also be referred to as an even throttle assist entry condition or a release condition of the power priority mode.

Furthermore, when the controller 20 determines that all of the first entry condition, the second entry condition, and the third entry condition are sequentially satisfied, a process of actually transitioning the mode from the power priority mode to the responsiveness priority mode (backlash band evasion mode) is performed.

To perform the transition process, the controller 20 presets a threshold in each entry condition, that is, a brake input threshold BPS_thresh, a longitudinal acceleration threshold Ax_thresh, a steering threshold SWA_thresh, a transverse acceleration threshold Ay_thresh, an entry determination torque threshold Tq_thresh1, an acceleration input threshold APS_thresh, and a release determination torque threshold Tq_thresh2.

In an exemplary embodiment of the present disclosure, the sequential satisfaction of the first entry condition, the second entry condition, and the third entry condition does not mean a state in which the first entry condition, the second entry condition, and the third entry condition are necessarily satisfied at the same time.

That is, due to the characteristics of the entry condition in which the first entry condition, the second entry condition, and the third entry condition should be sequentially satisfied, to satisfy the entry conditions of the responsiveness priority mode, it is not necessary that the second entry condition is necessarily satisfied while the first entry condition is being satisfied or the third entry condition is necessarily satisfied while the second entry condition is being satisfied.

However, in a state in which there is a satisfaction history indicating that a preceding condition, which is an entry condition of a previous order, has been satisfied, a following condition, which is an entry condition of a following order, needs to be satisfied, and when a satisfaction history of the preceding condition has been already deleted and initialized and thus is not present even when the following condition is satisfied at a current time point, it is determined that the entry conditions of the responsiveness priority mode are not satisfied at the current time point.

That is, when the second entry condition is satisfied in a state in which a satisfaction history of the first entry condition is present and the third entry condition is satisfied in a state in which a satisfaction history of the second entry condition is present, it is determined that all the entry conditions of the responsiveness priority mode are satisfied.

Here, the preceding condition is the entry condition of the preceding order based on the order, and the entry condition of the following order is the following condition. Furthermore, the entry condition which is currently being determined based on a determination time point is the following condition compared to the entry condition of the preceding order in which the satisfaction history is present.

Furthermore, when the following condition, which is the following order, is satisfied in the state in which the satisfaction history of the preceding condition is present, the satisfaction history of the preceding condition is automatically deleted and initialized at a time point at which the following condition has been satisfied.

For example, when the second entry condition is satisfied in the state in which the satisfaction history of the first entry condition is present, the satisfaction history of the first entry condition is automatically deleted and initialized at a time point at which the second entry condition has been satisfied.

Furthermore, when the third entry condition is satisfied in the state in which the satisfaction history of the second entry condition is present, the satisfaction history of the second entry condition is automatically deleted and initialized at a time point at which the third entry condition has been satisfied.

Furthermore, the vehicle driving information for determining the transition and entry from the power priority mode to the responsiveness priority mode in the first entry condition, the second entry condition, and the third entry condition includes the BPS value, the vehicle longitudinal acceleration Ax, the SWA, the vehicle transverse acceleration Ay, the entire torque command (required torque command) Tq_cmd, and the APS value.

That is, the vehicle driving information for determining the first entry condition includes the BPS value and the vehicle longitudinal acceleration Ax, and the vehicle driving information for determining the second entry condition includes the SWA and the vehicle transverse acceleration Ay. Furthermore, the vehicle driving information for determining the third entry condition may include the BPS value, the entire torque command Tq_cmd, or the required torque.

In the exemplary embodiment of the present disclosure, the first entry condition may be set to a condition in which the BPS value is greater than the brake input threshold BPS_thresh and an absolute value of the vehicle longitudinal acceleration $|Ax|$ is greater than the longitudinal acceleration threshold Ax_thresh.

As a result, when the BPS value is greater than the brake input threshold (BPS value>BPS_thresh) and the absolute value of the vehicle longitudinal acceleration $|Ax|$ is greater than the longitudinal acceleration threshold Ax_thresh ($|Ax|$>Ax_thresh), the controller 20 may be configured to determine that the first entry condition is satisfied.

On the other hand, when the BPS value is smaller than or equal to the BPS value (BPS value<BPS_thresh) or the absolute value of the vehicle longitudinal acceleration is smaller than or equal to the longitudinal acceleration threshold ($|Ax|$<Ax_thresh), the controller 20 may be configured to determine that the first entry condition is not satisfied.

Furthermore, the second entry condition may be set to a condition in which the SWA is greater than the steering threshold SWA_thresh and an absolute value of the vehicle transverse acceleration $|Ay|$ is greater than a transverse acceleration threshold Ay_thresh.

In the case of the SWA, when the SWA is defined as the positive (+) value in a right-turn state in which a driver rotates a steering wheel to a right side, and the SWA is defined as the negative (−) value in a left-turn state in which the driver rotates the steering wheel to a left side with respect to the on center portion of the steering wheel, an absolute value of the SWA $|SWA|$ may be used.

As a result, when the SWA is greater than the steering threshold ($|SWA|>SWA\_thresh$) and the absolute value of the vehicle transverse acceleration is greater than the transverse acceleration threshold ($|Ay|>Ay\_thresh$), the controller 20 may be configured to determine that the second entry condition is satisfied.

On the other hand, when the SWA is smaller than or equal to the steering threshold ($|SWA|\leq SWA\_thresh$) or the absolute value of the vehicle transverse acceleration is smaller than or equal to the transverse acceleration threshold ($|Ay|\leq Ay\_thresh$), the controller 20 may be configured to determine that the second entry condition is not satisfied.

Furthermore, the third entry condition may be set to a condition in which there is no brake pedal position input of the driver or an absolute value of the entire torque command $|Tq\_cmd|$ (or the required torque) required for the travel of the vehicle is smaller than the entry determination torque threshold $Tq\_thresh1$.

Therefore, when there is no brake pedal position input of the driver (BPS value==0) or when the absolute value of the entire torque command required for the travel of the vehicle is smaller than the entry determination torque threshold ($|Tq\_cmd|<Tq\_thresh1$), the controller 20 may be configured to determine that the third entry condition is satisfied.

On the other hand, when there is the brake pedal position input of the driver (BPS value≠0)) or the absolute value of the entire torque command required for the travel of the vehicle is greater than or equal to the entry determination torque threshold ($|Tq\_cmd|\geq Tq\_thresh1$), the controller 20 may be configured to determine that the third entry condition is not satisfied.

The controller 20 is configured to determine whether the first entry condition, the second entry condition, and the third entry condition are sequentially satisfied in the power priority mode and when all of the entry conditions are satisfied in an order of the first entry condition, the second entry condition, and the third entry condition, performs the entry and transition to the responsiveness priority mode and then performs control for the responsiveness priority mode (even throttle assist).

Meanwhile, the controller 20 may further set the release condition of the responsiveness priority mode in which the responsiveness priority mode is released in the state of the responsiveness priority mode and the mode may be transitioned to the power priority mode (normal mode).

In an exemplary embodiment of the present disclosure, the release condition of the responsiveness priority mode may be referred to as a transition condition from the responsiveness priority mode to the power priority mode and may also be referred to as the entry condition of the power priority mode or the release condition of the even throttle assist.

The controller 20 is configured to determine whether the release condition of the responsiveness priority mode is satisfied based on the vehicle driving information, and in the release condition, the vehicle driving information for determining the release of the responsiveness priority mode may include the APS value and the entire torque command (required torque command).

In the exemplary embodiment of the present disclosure, the release condition of the responsiveness priority mode may be set to a condition in which the APS value is greater than the acceleration input threshold APS_thresh and the entire torque command Tq_cmd is greater than the release determination torque threshold Tq_thresh2.

Therefore, in the current entry state of the responsiveness priority mode, when the APS value is greater than the acceleration input threshold (APS>APS_thresh) and the entire torque command is greater than the release determination torque threshold (Tq_cmd>Tq_thresh2), the controller 20 may be configured to determine that the release condition of the responsiveness priority mode is satisfied.

However, when the APS value is smaller than or equal to the acceleration input threshold (APS≤APS_thresh) and the entire torque command is smaller than or equal to the release determination torque threshold (Tq_cmd≤Tq_thresh2), the controller 20 may be configured to determine that the release condition of the responsiveness priority mode is not satisfied.

As described above, when it is determined that the release condition of the responsiveness priority mode is satisfied, the controller 20 releases the responsiveness priority mode, transitions the mode to the power priority mode, and then is configured to control the power priority mode. On the other hand, when the release condition of the responsiveness priority mode is not satisfied, the controller 20 maintains the responsiveness priority mode and then is configured to perform the control of the responsiveness priority mode.

To release the even throttle assist, it is necessary to determine that the even throttle control process has ended and the escape from a re-acceleration corner is imminent. This is because it is necessary to cope with a subsequent acceleration zone that requires the maximum torque at the same time as the end portion of the turn.

Therefore, the release condition of the even throttle assist may be determined to be a condition in which the APS value and the entire torque command (or the required torque) exceed each threshold.

Furthermore, to accurately determine that a continuous acceleration zone will follow rather than an instantaneous accelerator pedal input, only when a state in which the APS value and the entire torque command (or the required torque) exceed each predetermined threshold is continuously maintained for a predetermined time period or longer after the APS value and the entire torque command (or the required torque) exceed each threshold, the controller 20 may also be set to determine that the release condition of the responsiveness priority mode (even throttle assist mode) is satisfied.

Figure 6:
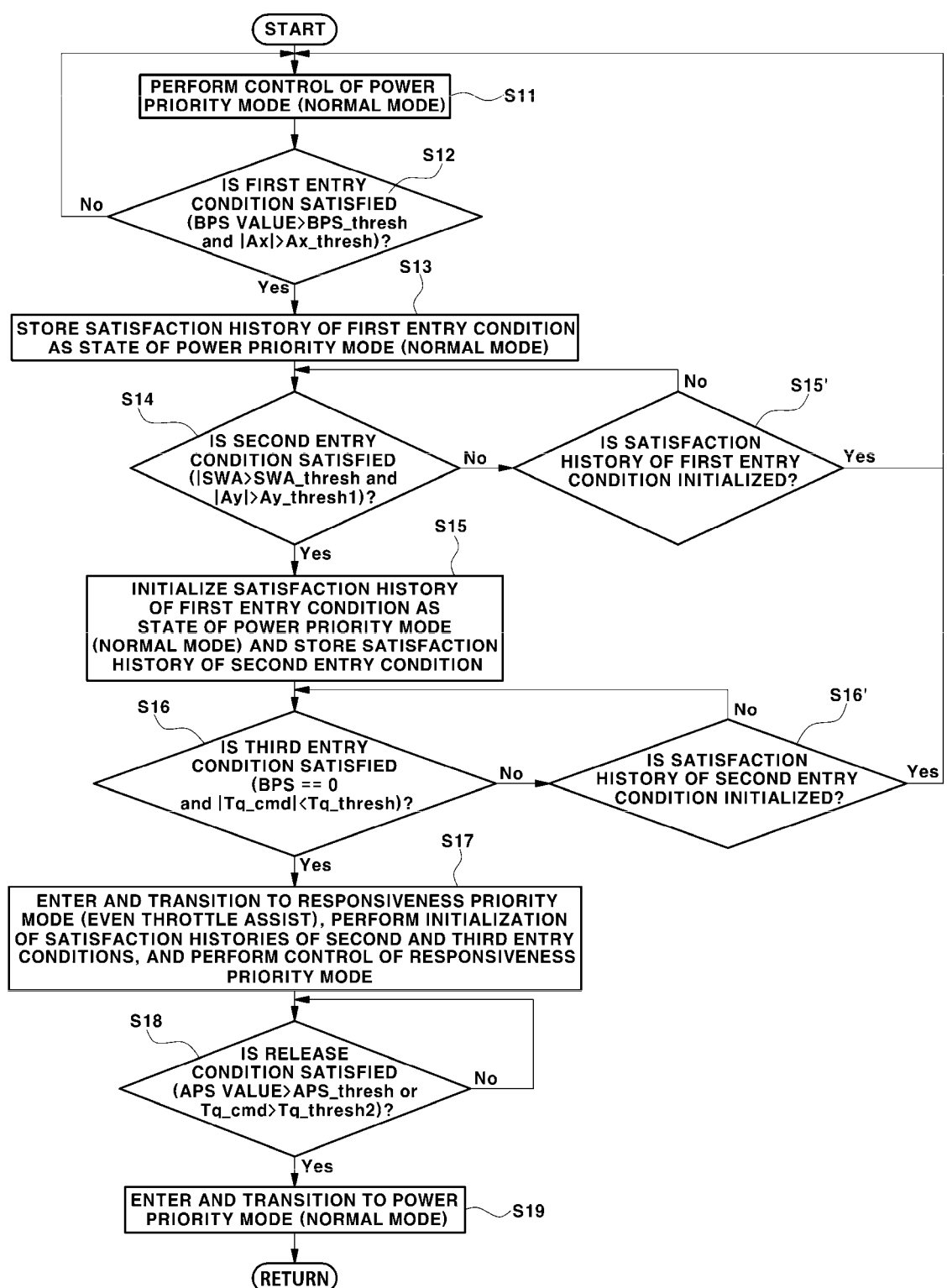
FIG. 6 is a flowchart illustrating a process of performing mode selection and transition in the drive system torque control process according to the exemplary embodiment of the present disclosure.

FIG. 6 is a flowchart illustrating a process of performing mode selection and transition in the drive system torque control process according to the exemplary embodiment of the present disclosure.

Referring to FIG. 6, the controller 20 first monitors whether the current vehicle driving state satisfies the first entry condition during the power priority mode (normal mode) (operation S11) (operation S12).

Subsequently, when it is determined that the first entry condition is satisfied during monitoring, the controller 20 stores the satisfaction history of the first entry condition in the state in which the power priority mode (normal mode) is maintained (operation S13). When the first entry condition is not satisfied, the controller 20 maintains the power priority mode.

Subsequently, the controller 20 monitors whether the current vehicle driving state satisfies the second entry condition (operation S14). When the second entry condition is satisfied during monitoring, the controller 20 stores the satisfaction history of the second entry condition in the state in which the power priority mode (normal mode) is maintained, and when there is the previous satisfaction history of the first entry condition, the satisfaction history of the first entry condition is deleted and initialized (operation S15).

However, when the current vehicle driving state does not satisfy the second entry condition, the controller 20 checks whether there is the current satisfaction history of the first entry condition (operation S15'). At the instant time, when there is the satisfaction history of the first entry condition, the controller 20 continuously monitors whether the current vehicle driving state satisfies the second entry condition (operation S14).

On the other hand, in the state in which the satisfaction history of the first entry condition is not present and initialized, the controller 20 does not satisfy both the first entry condition and the second entry condition and thus does not satisfy the entry conditions of the responsiveness priority mode, and thus thereafter, the power priority mode (normal mode) is continuously maintained (operation S19).

Furthermore, the controller 20 monitors whether the current vehicle driving state satisfies the third entry condition (operation S16). When the third entry condition is satisfied during monitoring, the controller 20 checks whether there is the previous satisfaction history of the second entry condition.

At the present time, when there is the satisfaction history of the second entry condition, the first entry condition, the second entry condition, and the third entry condition are sequentially satisfied, and thus the controller is finally configured to determine that the entry conditions of the responsiveness priority mode are satisfied.

Therefore, the controller 20 deletes and initializes all satisfaction histories of the second entry condition and the third entry condition and at the same time, enters and transitions to the responsiveness priority mode (execution of the backlash band evasion mode or the even throttle assist), and then is configured to perform the control of the responsiveness priority mode.

However, when the current vehicle driving state does not satisfy the third entry condition, the controller 20 checks whether there is the current satisfaction history of the second entry condition (operation S16'). At the instant time, when there is the satisfaction history of the second entry condition, the controller 20 continuously monitors whether the current vehicle driving state satisfies the third entry condition (operation S16).

On the other hand, when the satisfaction history of the second entry condition is not present because it has already been deleted and initialized previously, the controller 20 is configured to determine that the entry conditions of the responsiveness priority mode are not satisfied, and thus thereafter, the power priority mode (normal mode) is continuously maintained (operation S19).

Furthermore, when it is determined whether the release condition of the responsiveness priority mode is satisfied during the responsiveness priority mode (operation S18) and the release condition is satisfied, the controller 20 enters and transitions to the power priority mode (normal mode) again and then is configured to perform the control of the power priority mode (operation S19). On the other hand, when the release condition is not satisfied during the responsiveness priority mode, the controller 20 maintains the responsiveness priority mode in operation S17.

Describing the transition condition in which the mode may be transitioned from the power priority mode to the responsiveness priority mode, that is, the entry conditions of the responsiveness priority mode (even throttle assist), it should be determined that there is a turning situation of the performance-oriented driving to enter the responsiveness priority mode.

In general, because the vehicle needs to decelerate before turning starts, it may be determined that the start of turning is imminent based on a brake pedal position input amount of the driver and a vehicle longitudinal acceleration.

Therefore, it may be determined that the first entry condition is satisfied when the BPS value and the vehicle longitudinal acceleration Ax are greater than each preset threshold. At the instant time, the vehicle longitudinal acceleration may use a filtered value to exclude an influence of a gradient and slope of a road. Furthermore, the use of the absolute value of the vehicle longitudinal acceleration regardless of a direction or the use of only the longitudinal acceleration value in a deceleration direction may be applied.

Upon determining the responsiveness priority mode, it is not sufficient to satisfy the first entry condition because the first entry condition is satisfied even during emergency braking. Therefore, it should be additionally determined whether the second entry condition is satisfied.

The second entry condition is a condition for determining whether turning actually starts. In general, during turning of the performance-oriented driving, the driver starts turning while reducing the brake pedal position input amount. Therefore, the second entry condition may be set to be satisfied when magnitudes of the SWA and the vehicle transverse acceleration are greater than or equal to predetermined values after the first entry condition is satisfied.

However, this is also not sufficient as a condition for determining the entry into the responsiveness priority mode (even throttle assist) because both the first entry condition and the second entry condition may be satisfied even during emergency evasion.

Therefore, the third entry condition should be considered as a final determination condition. The third entry condition may be set to be satisfied when the BPS value of the driver is zero or the entire torque command is smaller than a set entry determination threshold after the first entry condition and the second entry condition are sequentially satisfied. Here, when the entire torque command is smaller than the entry determination threshold, it means that a case in which the entire torque command is zero is also included.

In reality, because the even throttle control is performed when the driver starts to step on the accelerator pedal without stepping on the brake pedal, the fact that the brake pedal position input amount of the driver becomes zero after the first entry condition and the second entry condition are satisfied indicates that the even throttle input in which the driver applies the accelerator pedal in the turning zone is imminent.

Therefore, it is appropriate to enter the responsiveness priority mode in which the even throttle assist function is performed at the moment when the third entry condition is satisfied, and upon entering the responsiveness priority mode at a time point at which all pedals are turned off, the fact that no load movement and sense of disconnection in the vehicle due to the change in the torque occurs may also become a reason for suitability as the entry condition.

Furthermore, as described above, all of the first entry condition, the second entry condition, and the third entry condition do not necessarily have to be simultaneously satisfied, and two of the three conditions do not necessarily have to be satisfied at the same time.

However, when the first entry condition, the second entry condition, and the third entry condition are sequentially satisfied, the controller 20 may be configured to determine that the entry condition of the responsiveness priority mode is satisfied even when two or more conditions are not simultaneously satisfied.

Furthermore, in the state in which the satisfaction history of the preceding condition is present, the following condition needs to be satisfied, and at the instant time, when the following condition is satisfied, the satisfaction history of the preceding conditions is deleted and initialized from the controller 20.

Furthermore, there are other restrictions on the satisfaction of the first entry condition, the second entry condition, and the third entry condition. That is, only when the following condition is satisfied within a preset time after the preceding condition is satisfied, the sequential satisfaction state of the preceding condition and the following condition may be set to be valid.

Similarly, instead of the above-described method of setting the time, when the preceding condition is satisfied and then the following condition is satisfied, only when the BPS value of the driver or the absolute value of the entire torque command (or the required torque) does not exceed each set threshold for a time between satisfaction time points of two conditions, it may be determined that the preceding condition and the following condition are sequentially satisfied.

Figure 7:
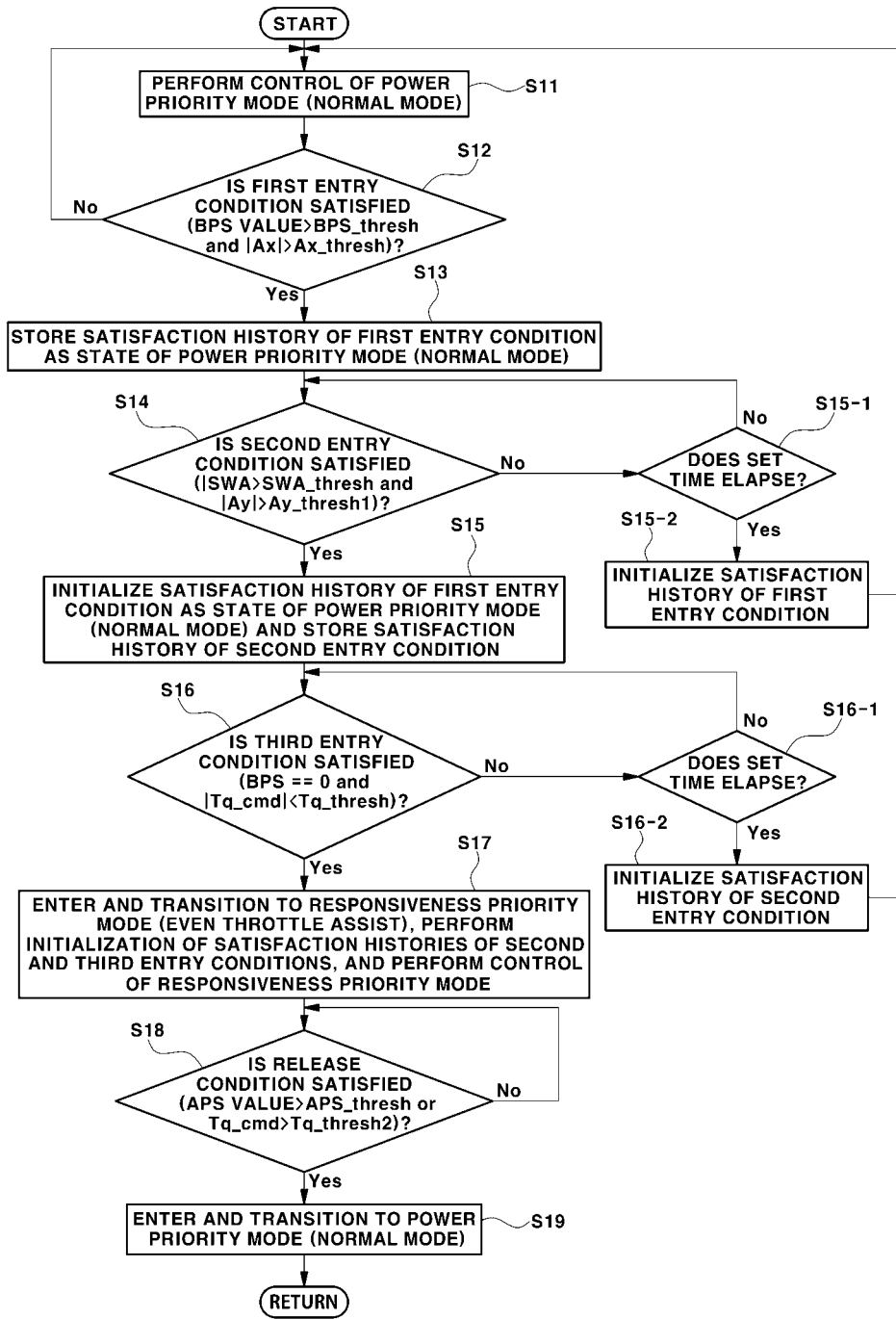
FIG. 7 is a flowchart illustrating another example of the process of performing the mode selection and transition in the drive system torque control process according to the exemplary embodiment of the present disclosure.

FIG. 7 is a flowchart illustrating another example of the process of performing the mode selection and transition in a process of controlling the torque of the drive system according to the exemplary embodiment of the present disclosure and illustrates an example in which the sequential satisfaction states of the preceding condition and the following condition are set to be valid only when the following condition is satisfied within the set time after the preceding condition is satisfied.

Referring to FIG. 7, the controller 20 first monitors whether the current vehicle driving state satisfies the first entry condition during the power priority mode (normal mode) (operation S11) (operation S12).

Subsequently, when it is determined that the first entry condition is satisfied during monitoring, the controller 20 stores the satisfaction history of the first entry condition in the state in which the power priority mode (normal mode) is maintained (operation S13). When the first entry condition is not satisfied, the controller 20 maintains the power priority mode.

Subsequently, the controller 20 monitors whether the current vehicle driving state satisfies the second entry condition in the state in which the satisfaction history of the first entry condition is present (operation S14). When the second entry condition is not satisfied during monitoring, the controller 20 is configured to determine whether the set time elapses in the state in which the second entry condition is not satisfied (operation S15-1).

When the set time elapses in the unsatisfied state, the controller 20 deletes and initializes the satisfaction history of the first entry condition (operation S15-2), and the subsequent process returns to operation S11. However, when the current vehicle driving state satisfies the second entry condition during the execution of the monitoring in operation S14 in the state in which the satisfaction history of the first entry condition is present, the controller 20 stores the satisfaction history of the second entry condition in the state in which the power priority mode (normal mode) is maintained (operation S15). At the instant time, the satisfaction history of the first entry condition is deleted and initialized.

Subsequently, the controller 20 monitors whether the current vehicle driving state satisfies the third entry condition in the state in which the satisfaction history of the second entry condition is present (operation S16). When the third entry condition is not satisfied during monitoring, the controller 20 is configured to determine whether the set time elapses in the state in which the third entry condition is not satisfied (operation S16-1).

When the set time elapses in the unsatisfied state, the controller 20 deletes and initializes the satisfaction history of the second entry condition (operation S16-2), and the subsequent process returns to operation S11.

However, when the current vehicle driving state satisfies the third entry condition during the execution of the monitoring in operation S16 in the state in which the satisfaction history of the second entry condition is present, the controller 20 deletes and initializes the satisfaction histories of the second entry condition and the third entry condition, at the same time, enters and transitions to the responsiveness priority mode (execution of the backlash band evasion mode or the even throttle assist), and then is configured to perform the control of the responsiveness priority mode (operation S17).

Accordingly, when it is determined whether the release condition of the responsiveness priority mode is satisfied (operation S18) and the release condition is satisfied, the controller 20 enters and transitions to the power priority mode (normal mode) again and then is configured to perform the control of the power priority mode (operation S19). On the other hand, when the release condition is not satisfied during the responsiveness priority mode, the controller 20 maintains the responsiveness priority mode in operation S17.

Figure 8:
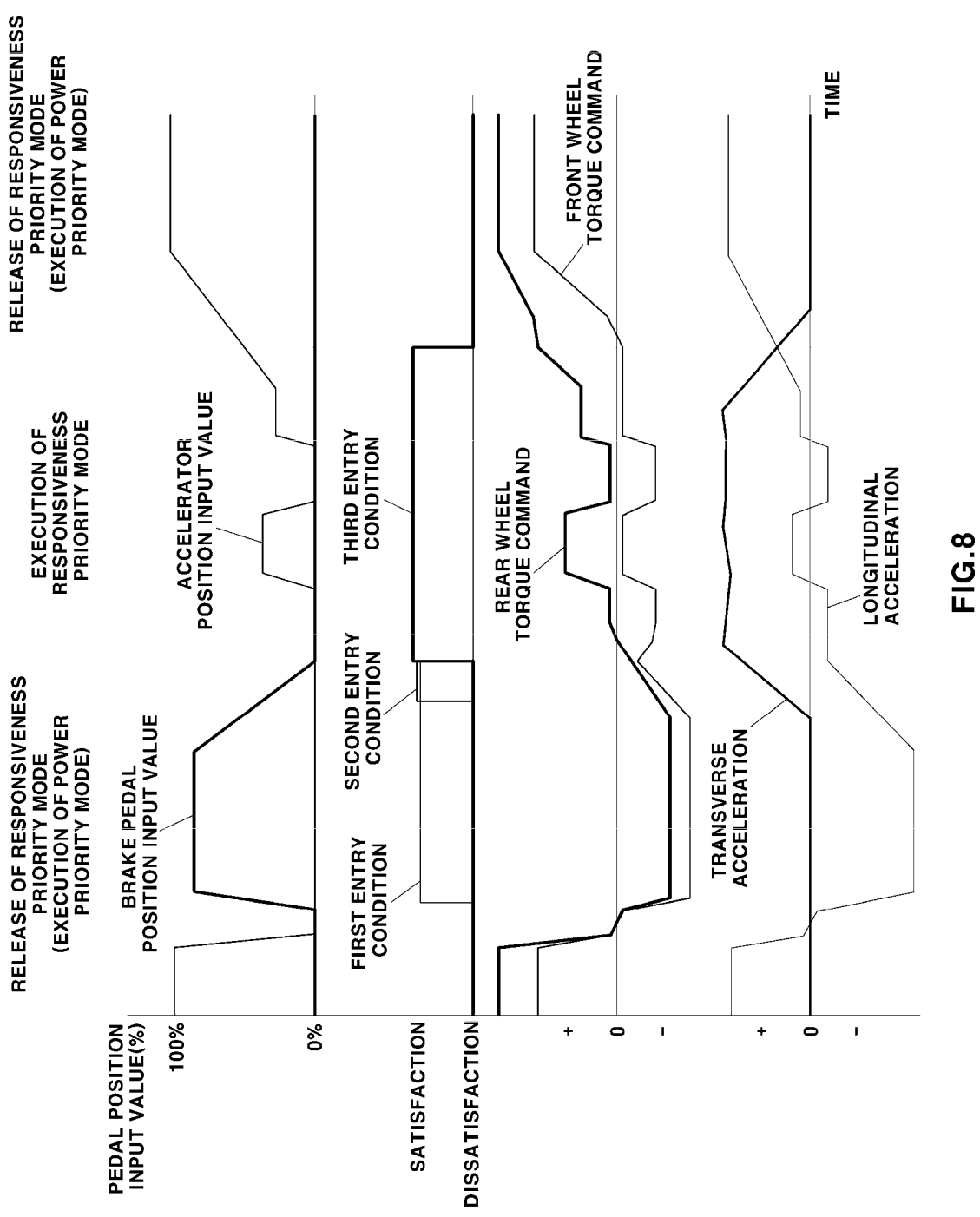
FIG. 8 is a view exemplarily illustrating a front wheel torque command and a rear wheel torque command in a release and entry state of the responsiveness priority mode in an exemplary embodiment of the present disclosure.

FIG. 8 is a view exemplarily illustrating a front wheel torque command and a rear wheel torque command in a release and entry state of the responsiveness priority mode in an exemplary embodiment of the present disclosure.

Referring to FIG. 8, in a state in which the responsiveness priority mode is released (state of the power priority mode), when the BPS value is greater than the brake input threshold BPS_thresh and the absolute value of the vehicle longitudinal acceleration |Ax| is the longitudinal acceleration threshold Ax_thresh, it is determined that the vehicle driving state satisfies the first entry condition.

In the example of FIG. 8, in a state in which the SWA is greater than the steering threshold SWA_thresh and the absolute value of the vehicle transverse acceleration |Ay| is greater than the transverse acceleration threshold Ay_thresh, it is determined that the vehicle driving state satisfies the second entry condition.

Furthermore, in the example of FIG. 8, in a state in which the brake pedal position input of the driver is not present after the second entry condition is satisfied (BPS value==0), it is determined that the vehicle driving state satisfies the third entry condition, and as a result, in the state in which the first entry condition, the second entry condition, and the third entry condition are sequentially satisfied, the entry conditions of the responsiveness priority mode are satisfied, and thus the entry and transition to the responsiveness priority mode are performed.

In the state of the responsiveness priority mode, the front wheel torque command is determined to be a value which is smaller than or equal to the front wheel maximum torque threshold and is limited not to exceed the front wheel maximum torque threshold. Furthermore, in the state of the responsiveness priority mode, the rear wheel torque command is determined to be a value which is greater than or equal to the rear wheel minimum torque threshold and is limited not to be smaller than the rear wheel minimum torque threshold.

Furthermore, referring to FIG. 8, when the APS value is greater than the acceleration input threshold APS_thresh in the state of the responsiveness priority mode, it is determined that the vehicle driving state satisfies the release condition of the responsiveness priority mode.

When the release condition of the responsiveness priority mode is satisfied, the entry and transition to the power priority mode are performed simultaneously with the release of the responsiveness priority mode, and then when the entire torque command corresponding to the APS value is determined during the control of the power priority mode, the general front and rear wheel distribution process of distributing the entire torque command to the front wheel torque command and the rear wheel torque command according to the front and rear wheel torque distribution ratio is performed.

Referring to FIG. 8, in the case of the responsiveness priority mode, the rear wheel torque command is determined to be a positive (+) torque value and the front wheel torque command is determined to be a negative (−) torque value, but it may be seen that both the rear wheel torque command and the front wheel torque command are determined to be the positive (+) torque values when the mode is transitioned from the responsiveness priority mode to the power priority mode.

FIG. 8 illustrates an example of a state in which the mode is released from the responsiveness priority mode and then becomes the responsiveness priority mode, and then the responsiveness priority mode is released based on vehicle driving information.

In the release state of the responsiveness priority mode, the even throttle assist function is released without being performed, and the control of the power priority mode is performed. Accordingly, when the entry and transition to the responsiveness priority mode are performed, the even throttle assist function may be performed while the control of the responsiveness priority mode is performed.

Accordingly, when the responsiveness priority mode is re-released and the mode is transitioned to the power priority mode, the even throttle assist function is not performed and re-released, and then the control of the power priority mode is re-performed.

As described above, in an exemplary embodiment of the present disclosure, the mode transition according to the vehicle driving state may be automatically performed based on the vehicle driving information collected in real time in the vehicle, and, the active even throttle assist function in which the active and automatic switching between the power priority mode and the responsiveness priority mode is performed may be performed.

Therefore, according to the method of controlling the drive system torque according to an exemplary embodiment of the present disclosure, because the motor is used only in the torque region irrelevant to the backlash while the backlash band evasion control is performed and the motor control specialized in the high-performance driving mode is performed, it is possible to prevent the occurrence of the backlash itself Furthermore, it is possible to effectively solve the problems of backlash vibration, noises, and impact, improve the vehicle turning performance, and greatly improve the longitudinal responsiveness of the vehicle as the occurrence of the torque is possible without worrying about the backlash problem.

Conventionally, there is the problem that the vehicle torque responsiveness to the driver's input is reduced by the execution of the backlash control for alleviating the backlash impact in the turning zone even during performance-oriented driving, and as a result, there is the problem that the lap time is increased and the transverse stability is reduced accordingly, but it is possible to solve the above-described conventional problems.

Furthermore, it is possible to provide the driving mode emphasizing the sense of direct connection for the high-performance electric vehicle only, improve the convenience and accuracy of the load movement control during track turning, and improve the ease of the use of the special driving mode such as a drift mode.

Furthermore, in an exemplary embodiment of the present disclosure, it is possible to perform the active even throttle assist function that assists performance-oriented driving by performing the active switching between the power priority mode and the responsiveness priority mode, improve the turning performance of the vehicle, shorten the lap time of the vehicle, and improve the transverse stability during turning.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a drive system torque of an electric vehicle, the method comprising:

determining, by a controller, an entire torque command required for travel of the vehicle;

determining, by the controller, whether a plurality of predetermined entry conditions for entering a responsiveness priority mode of the vehicle are satisfied in a predetermined order based on vehicle driving information in a state in which control of a power priority mode in which front wheel torque control and rear wheel torque control are performed using a front wheel torque command and a rear wheel torque command respectively is performed; and transitioning, by the controller, a mode to the responsiveness priority mode in which the front wheel torque control and the rear wheel torque control are performed using the front wheel torque command and the rear wheel torque command for evading a backlash band, which is a torque region in which backlash of a drive system occurs, in response that the plurality of entry conditions are sequentially satisfied and performing control of the responsiveness priority mode, wherein the vehicle driving information for determining whether the plurality of entry conditions are satisfied includes a brake pedal position input value, a vehicle longitudinal acceleration, a steering wheel angle which is a steering input value, a vehicle transverse acceleration, the entire torque command, and an accelerator position input value, wherein the controller determines whether each of the plurality of entry conditions is satisfied based on a result of comparing each of the vehicle driving information with a respective preset threshold stored in a memory, and sequentially determines whether the entry conditions are satisfied in an order of a first entry condition, a second entry condition, and a third entry condition, wherein the plurality of entry conditions include:

the first entry condition in which the brake pedal position input value is greater than a preset brake input threshold and an absolute value of the vehicle longitudinal acceleration is greater than a preset longitudinal acceleration threshold;

the second entry condition in which the steering wheel angle is greater than a preset steering threshold and an absolute value of the vehicle transverse acceleration is greater than a preset transverse acceleration threshold; and the third entry condition in which there is no brake pedal position input or an absolute value of the entire torque command is smaller than a preset entry determination torque threshold.

2. The method of claim 1, wherein in the performing of the control of the responsiveness priority mode, the front wheel torque command is determined to be a value which is smaller than or equal to a front wheel maximum torque threshold set to a negative (−) torque value, and the rear wheel torque command is determined to be a value which is greater than or equal to a rear wheel minimum torque threshold set to a positive (+) torque value.

3. The method of claim 2, wherein the front wheel maximum torque threshold is set to a value which is smaller than a lower limit threshold in the backlash band, which is the torque region in which the backlash occurs in a front wheel side drive system, and wherein the rear wheel minimum torque threshold is set to a value which is greater than an upper limit threshold in the backlash band, which is the torque region in which the backlash occurs in a rear wheel side drive system.

4. The method of claim 3, wherein each of the backlash band of the front wheel side drive system and the backlash band of the rear wheel side drive system is set to a torque range including a zero torque in a range of the lower limit threshold, which is the negative (−) value, and the upper limit threshold, which is the positive (+) value.

5. The method of claim 2, wherein in the responsiveness priority mode, the controller is configured to:

determine the rear wheel torque command to be the rear wheel minimum torque threshold in response that the entire torque command is smaller than or equal to the rear wheel minimum torque threshold after comparing the entire torque command with the rear wheel minimum torque threshold; and determine the front wheel torque command to be a value obtained by subtracting the determined rear wheel torque command from the entire torque command.

6. The method of claim 2, wherein in the responsiveness priority mode, the controller is configured to:

determine the front wheel torque command to be the front wheel maximum torque threshold in response that the entire torque command is greater than or equal to the front wheel maximum torque threshold after comparing the entire torque command with the front wheel maximum torque threshold; and determine the rear wheel torque command to be a value obtained by subtracting the determined front wheel torque command from the entire torque command.

7. The method of claim 2, wherein in the responsiveness priority mode, the front wheel torque command and the rear wheel torque command are determined so that a value obtained by summing the front wheel torque command and the rear wheel torque command follows the entire torque command.

8. The method of claim 1, wherein the controller is configured to transition the mode to the responsiveness priority mode in response that all of the plurality of entry conditions are satisfied in an order of the first entry condition, the second entry condition, and the third entry condition.

9. The method of claim 1, wherein the controller is configured to:

store a satisfaction history indicating that a corresponding entry condition has been satisfied whenever the first entry condition, the second entry condition, and the third entry condition are satisfied; and determine that the entry conditions of the responsiveness priority mode are satisfied so that the mode is transitioned to the responsiveness priority mode in response that the second entry condition is satisfied in a state in which a satisfaction history of the first entry condition is stored and present and the third entry condition is satisfied in a state in which a satisfaction history of the second entry condition is stored and present.

10. The method of claim 9, wherein the controller is configured to:

among the first entry condition and the second entry condition and among the second entry condition and the third entry condition, determine that the entry conditions of the responsiveness priority mode are not satisfied in response that there is no satisfaction history of a preceding condition, which is an entry condition of a preceding order even when a following condition, which is an entry condition of a following order, is satisfied; and delete and initialize the satisfaction history of the preceding condition in response that the following condition is satisfied in a state in which the satisfaction history of the preceding condition is present.

11. The method of claim 10, wherein the controller is configured to:

among the first entry condition and the second entry condition and among the second entry condition and the third entry condition, determine that the entry conditions of the responsiveness priority mode are not satisfied in response that there is no satisfaction history of the preceding condition, which is an entry condition of the preceding order even when the following condition, which is an entry condition of the following order, is satisfied; and delete and initialize the satisfaction history of the preceding condition in response that a state in which the following condition is not satisfied exceeds a set time in the state in which the satisfaction history of the preceding condition is present.

12. The method of claim 1, further including:

determining, by the controller, whether a predetermined release condition for releasing the responsiveness priority mode is satisfied based on the vehicle driving information in a state in which the control of the responsiveness priority mode is performed; and transitioning, by the controller, the mode to the power priority mode in response that the release condition is satisfied and performing the control of the power priority mode.

13. The method of claim 12, wherein the vehicle driving information for determining whether the release condition of the responsiveness priority mode is satisfied includes an accelerator position input value and the entire torque command.

14. The method of claim 13, wherein the release condition of the responsiveness priority mode includes a condition in which the accelerator position input value is greater than a preset accelerator position input threshold and the entire torque command is greater than a preset release determination torque threshold.

15. The method of claim 14, wherein the release condition of the responsiveness priority mode further includes a condition in which a state in which the accelerator position input value is greater than the accelerator position input threshold and the entire torque command is greater than the release determination torque threshold is continuously maintained for a predetermined time period or longer than the predetermined time period.

16. A vehicle of controlling a drive system torque of the vehicle, the vehicle comprising:

a driving system including a driving device configured for driving front and rear wheels of the vehicle; and a controller configured for:

determining an entire torque command required for travel of the vehicle;

determining whether a plurality of predetermined entry conditions for entering a responsiveness priority mode of the vehicle are satisfied in a predetermined order based on vehicle driving information in a state in which control of a power priority mode in which front wheel torque control and rear wheel torque control are performed using a front wheel torque command and a rear wheel torque command respectively is performed; and transitioning a mode to the responsiveness priority mode in which the front wheel torque control and the rear wheel torque control are performed using the front wheel torque command and the rear wheel torque command for evading a backlash band, which is a torque region in which backlash of the drive system occurs, in response that the plurality of entry conditions are sequentially satisfied and performing control of the responsiveness priority mode, wherein the vehicle driving information for determining whether the plurality of entry conditions are satisfied includes a brake pedal position input value, a vehicle longitudinal acceleration, a steering wheel angle which is a steering input value, a vehicle transverse acceleration, the entire torque command, and an accelerator position input value, wherein the controller determines whether each of the plurality of entry conditions is satisfied based on a result of comparing each of the vehicle driving information with a respective preset threshold stored in a memory, and sequentially determines whether the entry conditions are satisfied in an order of a first entry condition, a second entry condition, and a third entry condition, wherein the plurality of entry conditions include:

the first entry condition in which the brake pedal position input value is greater than a preset brake input threshold and an absolute value of the vehicle longitudinal acceleration is greater than a preset longitudinal acceleration threshold;

the second entry condition in which the steering wheel angle is greater than a preset steering threshold and an absolute value of the vehicle transverse acceleration is greater than a preset transverse acceleration threshold; and the third entry condition in which there is no brake pedal position input or an absolute value of the entire torque command is smaller than a preset entry determination torque threshold.

17. The vehicle of claim 16, wherein in the performing of the control of the responsiveness priority mode, the front wheel torque command is determined to be a value which is smaller than or equal to a front wheel maximum torque threshold set to a negative (−) torque value, and the rear wheel torque command is determined to be a value which is greater than or equal to a rear wheel minimum torque threshold set to a positive (+) torque value.

18. The vehicle of claim 16, wherein the controller is further configured for:

determining whether a predetermined release condition for releasing the responsiveness priority mode is satisfied based on the vehicle driving information in a state in which the control of the responsiveness priority mode is performed; and transitioning the mode to the power priority mode in response that the release condition is satisfied and performing the control of the power priority mode.

* * * * *